(12) United States Patent
Leong

(10) Patent No.: US 10,853,911 B2
(45) Date of Patent: Dec. 1, 2020

(54) DYNAMIC ADAPTATION OF IMAGES FOR PROJECTION, AND/OR OF PROJECTION PARAMETERS, BASED ON USER(S) IN ENVIRONMENT

(71) Applicant: Google LLC, Mountain View, CA (US)

(72) Inventor: Jian Wei Leong, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 150 days.

(21) Appl. No.: 15/955,297

(22) Filed: Apr. 17, 2018

(65) Prior Publication Data

US 2019/0325556 A1    Oct. 24, 2019

(51) Int. Cl.
*G06F 3/048* (2013.01)
*G06T 3/00* (2006.01)
*G06K 9/00* (2006.01)
*G06T 3/60* (2006.01)
*H04N 9/31* (2006.01)
(Continued)

(52) U.S. Cl.
CPC ........ *G06T 3/0093* (2013.01); *G06K 9/00369* (2013.01); *G06T 3/4084* (2013.01); *G06T 3/608* (2013.01); *H04N 9/3185* (2013.01); *H04N 9/3188* (2013.01); *G06F 3/013* (2013.01)

(58) Field of Classification Search
CPC .......... G06F 3/01; G06F 3/048; G06F 3/0481; G06F 3/0484; G06F 3/14; G06F 3/1415; G06F 17/27; G03B 21/14; G10L 15/22; H04N 9/31; H04N 9/3147; H04N 9/3185; H04N 9/3188; H04N 9/3194; G06K 9/00; G06K 9/00335; G06T 3/00; G06T 3/0093
See application file for complete search history.

(56) References Cited

U.S. PATENT DOCUMENTS 8,840,250 B1    9/2014  Yao et al.
9,588,408 B1*   3/2017  Linnell ................. G03B 21/14
(Continued)

OTHER PUBLICATIONS

European Patent Office; Invitation to Pay Additional Fees for Ser. No. PCT/US2019/027794; 21 pages; dated Jul. 24, 2019.
(Continued)

*Primary Examiner* — Xiomara L Bautista
(74) *Attorney, Agent, or Firm* — Middleton Reutlinger

(57) ABSTRACT

Implementations relate to dynamic adaptation of images for projection by a projector, based on one or more properties of user(s) that are in an environment with the projector. The projector can be associated with an automated assistant client of a client device. In some versions of those implementations, a pose of a user in the environment is determined and, based on the pose, a base image for projecting onto a surface is warped to generate a transformed image. The transformed image, when projected onto a surface and viewed from the pose of the user, mitigates perceived differences relative to the base image. The base image (on which the transformed image is based) can optionally be generated in dependence on a distance of the user. Some implementations additionally or alternatively relate to dynamic adaptation of projection parameters (e.g., a location for projection, a size of projection) based on one or more properties of user(s) that are in an environment with the projector.

19 Claims, 11 Drawing Sheets

(51) Int. Cl.
*G06T 3/40* (2006.01)
*G06F 3/01* (2006.01)

(56) References Cited

U.S. PATENT DOCUMENTS

| | | | |
|---|---|---|---|
| 2004/0036717 A1* | 2/2004 | Kjeldsen | G03B 21/28 |
| | | | 715/730 |
| 2007/0273842 A1 | 11/2007 | Morrison et al. | |
| 2008/0002262 A1* | 1/2008 | Chirieleison | G02B 27/0093 |
| | | | 359/630 |
| 2013/0229340 A1 | 9/2013 | Yu et al. | |
| 2014/0160341 A1* | 6/2014 | Tickoo | H04N 5/23293 |
| | | | 348/333.12 |
| 2015/0234541 A1 | 8/2015 | Gong | |
| 2015/0281629 A1* | 10/2015 | Davies | G06T 5/006 |
| | | | 348/51 |
| 2017/0026612 A1* | 1/2017 | Rintel | G06F 3/012 |
| 2017/0272729 A1* | 9/2017 | Kass | G06T 15/205 |
| 2017/0358141 A1* | 12/2017 | Stafford | G06F 3/013 |
| 2018/0007328 A1* | 1/2018 | Kursula | H04N 9/3194 |
| 2019/0037244 A1* | 1/2019 | Melkote Krishnaprasad | |
| | | | H04N 19/895 |
| 2019/0088257 A1* | 3/2019 | Shah | G10L 15/26 |
| 2019/0166339 A1* | 5/2019 | De La Cruz | G06T 7/246 |

OTHER PUBLICATIONS

European Patent Office; International Search Report and Written Opinion of Ser. No. PCT/US2019/027794; 26 pages; dated Sep. 18, 2019.

Makuake, "Move the bedroom to the best entertainment space. Smart light "popIn Aladdin"." https:www.makuake.com/project/popin-aladdin/. Last accessed Mar. 20, 2018. 25 pages.

Lardinois, F., "Baidu sets its sights on Japan with a voice-enabled projector in a dome light." https://techcrunch.com/2018/01/09/baidu-sets-its-sights-on-japan-with-a-voice-enabled-projector-in-a-dome-light/. Posted Jan. 9, 2018. Last accessed Mar. 20, 2018. 10 pages.

* cited by examiner

DYNAMIC ADAPTATION OF IMAGES FOR PROJECTION, AND/OR OF PROJECTION PARAMETERS, BASED ON USER(S) IN ENVIRONMENT

BACKGROUND

An automated assistant (also known as a "personal assistant", "mobile assistant", etc.) can be interacted with by a user via a variety of client devices such as projectors, smart phones, tablet computers, wearable devices, automobile systems, and/or standalone personal assistant devices. An automated assistant receives input from the user such as typed input, touch input, and/or spoken natural language input. The automated assistant can respond with responsive content such as visual and/or audible natural language output. An automated assistant interacted with a client device can be implemented via the client device itself and/or one or more remote computing devices, such as (but not limited to) computing device(s) in "the cloud", that are connected to the client device via a network.

SUMMARY

This disclosure relates to systems, methods, and apparatus for dynamic adaptation of images for projection by a projector, and/or of projection parameters, based on one or more properties of user(s) that are in an environment with the projector. Typically, as a user moves within a room, an image projected onto the same position of a wall will appear, to the user, to change due to the perspective change of the user based on the user's movement within the room. In other words, in such a typical situation the image projected onto the wall will remain the same as the user moves within the room—but the projected image, as perceived by the user, will appear to change as the user moves within the room. In implementations disclosed herein, a base image can be transformed, in dependence on a pose of a user, to generate a transformed image. As used herein, a "pose" references a position of a user, and optionally also an orientation of the user. The transformed image is different from the base image, but is generated such that when projected it appears to be substantially similar to the base image, when viewed from the pose of the user. Stated differently, if viewed from the same pose, the projected base image and the projected transformed image would be perceivable as different by the user. However, if the projected base image were viewed by the user from a first pose (e.g., "straight on") and the projected transformed image were viewed by the user from a second pose (e.g., at a 70° angle relative to "straight on"), they would be perceived as the same.

Accordingly, various implementations disclosed herein can selectively and dynamically transform base images, in dependence on a pose of a user. Through the selective and dynamic transformation of base images, transformed images can selectively be projected in lieu of their base image counterparts, such that projected images, when viewed by the user, appear to be substantially similar to their base image counterparts. It will be understood that some user poses will require no dynamic transformations, and the base image itself can be projected to the user. As used herein, a "base image" references a single image frame and optionally also an image that is part of a sequence of images that form a video or other dynamic sequence of images.

In many implementations, an automated assistant can identify active user(s) of the automated assistant in determining how to dynamically transform an image. For example, where multiple users are present, the automated assistant can identify a subset of those users as active users, determine at least one pose of the subset, and transform an image in dependence on the at least one pose of the subset. Active users can be identified by an automated assistant in a number of ways including by movement, location, pose, facial identification, voice identification, and/or gaze. In some implementations, rooms can contain more than one person and various numbers of active users. As an illustrative example, a room can contain one person and no active users, one person and one active user, several people and one active user, and/or several people and several active users. The number of active users in a room can change over time, and a redetermination of active users by the automated assistant can be used to determine new image transformation parameters to use in transforming base images for projection.

In a variety of implementations, images can be dynamically transformed (or "warped") by the automated assistant so the image appears the same as an active user moves within a room. Image warping can be a linear transformation, and can include a variety of processes including rotating the image, scaling the image, and skew adjusting the image. As an illustrative example of image warping, assume a base image that includes a pair of parallel lines. If the base image is projected, the lines would appear parallel to a user that is viewing the projection from a pose that is perpendicular to (e.g., directly in front of) a surface on which the projection is provided. However, if the user were instead viewing the projection of the base image from a non-perpendicular angle (e.g., from the side), the lines would appear non-parallel. Generating a transformed image based on warping the base image, and projecting the transformed image in lieu of the base image, can lead to the user still perceiving the lines as parallel even when the user is at a non-perpendicular angle (e.g., from the side). In other words, the user's perception of the projection of the transformed image can be more similar to the base image than would be the user's perception of a projection of the base image itself.

In some additional or alternative implementations, a base image can be generated and/or identified based on a distance of the user, where the distance of the user is indicative of the distance between the user and the surface upon which the image is projected (e.g., the distance can be based on a distance between the user and the projector, and optionally the distance from the projector to the surface). For example, interactive user interface (UI) elements can be included or excluded in a base image depending on the distance of the user from the projected image. For instance, when a user is relatively far away from a projection surface (e.g., more than 5 feet away or other "unreachable" distance), a base image can be identified or generated that lacks any interactive UI elements. In contrast, when a user is relatively close to a projection surface (e.g., within "reach" of the projection surface), a base image can be identified or generated that includes interactive UI elements. As another example, a first base image can be identified or generated when a user is within a first range of distances of the projection surface, and a second base image can be identified or generated when the user is instead within a second range of distances of the projection surface. For instance, in response to a user's request for "weather", either the first base image or the second base image can be identified and/or generated for projection, in dependence on a distance of the user. For instance, the first range of distances can include farther distances and the first base image can include less information such as only today's weather report. In contrast, the second range of distances can include closer distances and the second base image can include more information such as today's weather report and the weather report for one or more additional days. In some implementations, the projected image can be touch sensitive, giving a user close enough to touch the projection a modality via which to interact with the automated assistant (e.g., in addition to voice and/or gesture modalities).

Implementations disclosed herein can enhance the usability of an automated assistant through dynamic adaptation of what content is projected and/or how it is projected. Such dynamic adaptations can enable more accurate and/or more comprehendible representations of projected content from a variety of viewing poses. Such dynamic adaptations can be of benefit to, for example, users with low dexterity that may be constrained with respect to the poses from which they can view projected automated assistant content. In some additional or alternative implementations, generating and projecting a transformed image can reduce the duration of time that it is necessary for a projector to project the transformed image, thereby conserving power resources that would otherwise be required to project the transformed image for a longer duration. For example, when a user views a projected transformed image, the user can comprehend the information presented in the image more quickly (i.e., relative to if a base image were instead projected) and/or is less likely to need to move to understand the information in the projected image. This enables the projector to cease projecting of the transformed image more quickly. The projector can cease projecting of the transformed image, for example, in response a user command to dismiss the image (e.g., a command that request additional content that will supplant the image) or as a time-out after determining the user is no longer viewing the image. In some additional or alternative implementations, a cloud-based automated assistant component can send a base image and the client device can generate transformation(s) of the base image locally, obviating the need for further client-cloud-based automated assistant component network communications to request and transmit transformation(s). This can efficiently lessen the amount of data exchanged between cloud-based automated assistant component and the client since the cloud-based automated assistant component only needs to send a single base image instead of needing to send multiple image transformations along with each base image.

The above description is provided as an overview of some implementations disclosed herein. Additional description of these and other implementations is set forth in more detail herein.

In some implementations, a method is provided and includes identifying, by an automated assistant client of a computing device in an environment, a base image for projecting onto a surface via a projector accessible to the automated assistant client. The method further includes determining, using sensor data from at least one sensor, a first pose of a user in the environment. The sensor data is accessible to the automated assistant client. The method further includes determining, using the first pose of the user, first image transformation parameters for warping images. The method further includes generating a first transformed image that is a transformation of the base image, and causing the projector to project the transformed image onto the surface. Generating the first transformed image includes using the first image transformation parameters to warp the base image. The first transformed image, when projected onto the surface and viewed from the first pose of the user, mitigates perceived differences relative to the base image. The method further includes determining, using additional sensor data from the at least one sensor, a second pose of the user in the environment, where the second pose of the user indicates the user has moved. The method further includes determining, using the second pose of the user, second image transformation parameters for warping images. The method further includes generating a second transformed image that is a transformation of the base image or of an additional base image, and causing the projector to project the second transformed image onto the surface. Generating the second transformed image includes using the second transformation parameters to warp the base image or the additional base image. The second transformed image, when projected onto the surface and viewed from the second pose of the user, mitigates perceived differences relative to the base image or the additional base image.

These and other implementations of the technology disclosed herein can include one or more of the following features.

In some implementations, the base image is received, via a network interface of the computing device, from a remote automated assistant component that interfaces with the automated assistant client.

In some implementations, the base image is generated by the automated assistant client based on data received, via a network interface of the computing device, from a remote automated assistant component that interfaces with the automated assistant client.

In some implementations, the method further includes determining a distance of the surface to the projector using second sensor data from a second sensor. The second sensor data is accessible to the automated assistant client. In some versions of those implementations, determining the first image transformation parameters for warping images includes determining the first image transformation parameters using the first pose of the user and using the distance of the surface to the projector. In some additional or alternative version of those implementations, generating the second transformed image includes using the second pose of the user and the distance from the surface to the projector to warp the base image.

In some implementations, generating the first transformed image that is the transformation of the base image includes performing at least one linear transformation on the base image. In some of those implementations, the at least one linear transformation is selected from a group consisting of rotation of the base image, scaling of the base image, and skew adjustment of the base image.

In some implementations, the base image has first dimensions and the first transformed image has the same first dimensions. In some of those implementations, the base image includes base image pixels each having corresponding values assigned thereto, and the transformed image includes transformed image pixels. The transformed image pixels have the same corresponding values as the base image pixels, but the assignment of the same corresponding values to the transformed image pixels differs from the assignment of the corresponding values to the base image pixels in the base image. For example, a given transformed image pixel, having a given X and Y position in the transformed image, can have the same values as a given base image pixel, of the base image, where the given base image pixel that has a different X and Y position in the base image.

In some implementations, the method further includes determining, based on the first pose of the user, a desired size for the projection of the first transformed image. In some of those implementations, causing the projector to project the first transformed image onto the surface includes causing the projector to project the first transformed image to achieve the desired size for the projection.

In some implementations, identifying the base image includes selecting the base image, from a plurality of candidate base images, based on the first pose of the user. In some of those implementations, selecting the base image based on the first pose of the user includes: determining a distance of the user based on the first pose of the; and selecting the base image based on the distance corresponding to a distance measure assigned to the base image. The distance can be, for example, relative to the projector or relative to the surface.

In some implementations, the method further includes generating, by the automated assistant client, the base image based on the pose of the user. In some of those implementations, generating the base image based on the pose of the user includes: determining the pose of the user is within a threshold distance of the surface; and based on determining the pose of the user is within the threshold distance of the surface: generating the base image to include one or more interactive interface elements.

In some implementations, a method if provided and includes identifying, by an automated assistant client of a computing device, a base image for projecting onto a surface via a projector accessible to the automated assistant client. The method further includes identifying a plurality of users that are in an environment with the computing device, and determining, using sensor data from at least one sensor accessible to the computing device, that a subset of the users are active users for the automated assistant client. The method further includes determining at least one pose for the subset of the users that are determined to be active users. Determining the at least one pose is based on the sensor data or additional sensor data from at least one additional sensor accessible to the computing device. The method further includes, based on determining that the subset of the user are active users, using the at least one pose for the subset of the users in generating a transformed image of the base image. The method further includes causing the projector to project the transformed image onto the surface.

These and other implementations of the technology disclosed herein can include one or more of the following features.

In some implementations, the method further includes determining, using additional sensor data from the at least one sensor, that a second subset of the users are active users for the automated assistant client. The additional sensor data is generated at a time subsequent to the sensor data, and the second subset of the users varies from the first subset of the users. In those implementations, the method further includes: determining, based on the additional sensor data, at least one second pose for the second subset of the users that are determined to be active user; and based on determining that the second subset of the user are active users, using the at least one second pose for the second subset of the users in generating a second transformed image of the base image, or of an additional image, using the at least one second pose. In those implementations, the method further includes causing the projector to project the second transformed image onto the surface.

In some implementations, the method further includes: determining, based on the sensor data or additional sensor data, a gaze for the subset of the users that are determined to be active users; and generating the transformed image using the gaze of the one or more active users.

In some implementations, the method further includes: determining, based on the pose of the subset of the users, a desired size for the projection of the transformed image. In some of those implementations, causing the projector to project the transformed image onto the surface includes causing the projector to project the first transformed image to achieve the desired size for the projection.

In some implementations, a method is provided that includes identifying, by an automated assistant client of a computing device, a base image for projecting via a projector accessible to the automated assistant client. The method further includes identifying a plurality of users that are in an environment with the computing device. The method further includes determining, using sensor data from at least one sensor accessible to the computing device, that a subset of the users are active users for the automated assistant client. The method further includes determining at least one pose for the subset of the users that are determined to be active users. Determining the at least one pose is based on the sensor data or additional sensor data from at least one additional sensor accessible to the computing device. The method further includes, based on determining that the subset of the user are active users, using the at least one pose for the subset of the users in determining one or more projection parameters for a projection that includes the base image, or a transformed image that is a transform of the base image. The method further includes causing the projector to project the projection using the projector.

These and other implementations of the technology disclosed herein can include one or more of the following features.

In some implementations, the one or more projection parameters include one or multiple of: a size of the base image or the transformed image in the projection, a size of the projection, a location of the base image or the transformed image in the projection, and a location of the projection.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

DETAILED DESCRIPTION

Figure 1:
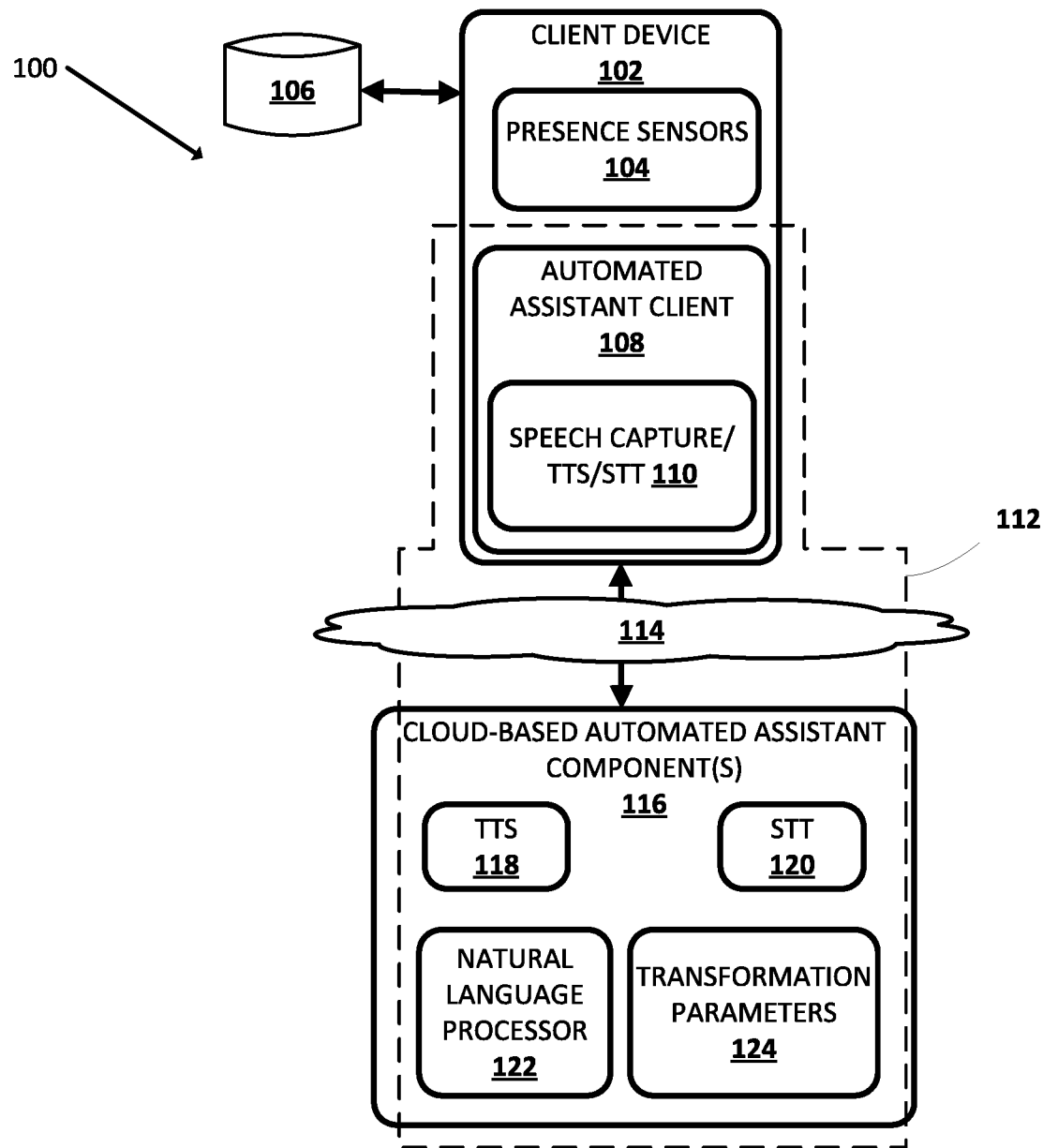
FIG. 1 is a block diagram illustrating an example environment in which various implementations can be implemented.

FIG. 1 illustrates an example environment 100 in which various implementations can be implemented. The example environment 100 includes one or more client devices 102. Each client device 102 may execute a respective instance of an automated assistant client 112. One or more cloud-based automated assistant components 116, such as natural language processor 122, may be implemented on one or more computing systems (collectively referred to as a "cloud" computing system) that are communicatively coupled to client devices 102 via one or more local and/or wide area networks (e.g., the internet) indicated generally as 114.

In various implementations, the instance of an automated assistant client 108, by way of its interactions with one or more cloud-based automated assistant components 116, may form what appears to be, from the user's perspective, a logical instance of an automated assistant 112 with which the user may engage in a dialogue. One instance of such an automated assistant 112 is depicted in FIG. 1 by a dashed line. It thus should be understood that each user that engages with an automated assistant client 108 executing on a client device 102 may, in effect, engage with his or her own logical instance of an automated assistant 112. For the sake of brevity and simplicity, the term "automated assistant" as used herein as "serving" a particular user may often refer to the combination of an automated assistant client 108 operated by the user and one or more cloud-based automated assistant components 116 (which may be shared amongst multiple automated assistant clients 108). It should also be understood that in some implementations, automated assistant 112 may respond to a request from any user regardless of whether the user is actually "served" by that particular instance of automated assistant 112.

Client device 102 may include, for example, one or more of: a desktop computing device, a laptop computing device, a tablet computing device, a touch sensitive computing device (e.g., a computing device which can receive input via touch from a user), a mobile phone computing device, a computing device of a vehicle of the user (e.g., an in-vehicle communications system, an in-vehicle entertainment system, an in-vehicle navigation system), a standalone interactive speaker, a smart appliance such as a smart television, a projector, and/or a wearable apparatus of the user that includes a computing device (e.g., a watch of the user having a computing device, glasses of the user having a computing device, a virtual or augmented reality computing device). Additional and/or alternative client computing devices may be provided.

Moreover, client device 102 can interface with a stand-alone projector 106—or can itself include an integral projector. In some implementations, stand-alone projector 106 and/or projector integrated within client device 102 can be "smart" projectors (i.e., the "smart" projector can either simply display images it receives from client device 102 and/or receive relevant data to generate image transformations at the projector before projecting a transformed image). Furthermore, projector 106 and/or integrated projector within the client device 102 may include, for example, liquid crystal display (LCD) projectors, digital light processing (DLP) projectors, light emitting diode (LED) projectors, hybrid LED and laser diode projectors, and/or laser diode projectors. Additionally, in many implementations, a projected image can be touch sensitive and include a touch interface which can similarly receive touch inputs and/or gestures for allowing a user to control the automated assistant via the touch interface of a projected image. Projectors displaying touch sensitive images can include a variety of infrared sensors, cameras, and/or other sensor(s) to detect a user's gestures and taps to determine how a user is interacting with the projected image.

Automated assistant client 108 can utilize either the projector integrated within client device 102 and/or stand-alone projector 106. In many implementations, automated assistant client 108 can utilize both projectors, for example using a different projector for a different situation. For example, automated assistant client 108 can utilize the projector integrated within client device 102 to project still images and stand-alone projector 106 to project a video sequence. Additionally, automated assistant client 108 can use different projectors in different lighting conditions depending on the specifications of the specific projectors, for example stand-alone projector 106 might project better in lower lighting conditions.

In various implementations, client device 102 may include one or more presence sensors 104 that are configured to provide signals indicative of detected presence, particularly human presence. Presence sensors may come in various forms, and can collect a variety of types of input to the automated assistant 112 such as verbal, textual, graphical, physical (e.g., a touch on a display device including a touch sensitive projector and/or a touch sensitive screen of a computing device), and/or visual (e.g., a gesture) based input. Some client devices 102 may be equipped with one or more digital cameras that are configured to capture and provide signal(s) indicative of movement detected in the fields of view. Additionally or alternatively, some client devices 102 may be equipped with presence sensors 104 that detect acoustic (or pressure) waves, such as one or more microphones.

Additionally or alternatively, in some implementations, presence sensors 104 may be configured to detect other phenomena associated with human presence. For example, in some implementations, a client device 102 may be equipped with a presence sensor 104 that detects various types of waves (e.g., radio, ultrasonic, electromagnetic, etc.) emitted by, for instance, a mobile client device 102 carried/operated by a particular user. For example, some client devices 102 may be configured to emit waves that are imperceptible to humans, such as ultrasonic waves or infrared waves, that may be detected by other client devices 102 (e.g., via ultrasonic/infrared receives such as ultrasonic-capable microphones).

Additionally or alternatively, various client devices 102 may emit other types of human-imperceptible waves, such as radio waves (e.g., Wi-Fi, Bluetooth, cellular, etc.) that may be detected by one or more client devices 102 and used to determine an operating user's particular position. In some implementations, Wi-Fi triangulation may be used to detect a user's position, e.g., based on Wi-Fi signals to/from a client device 102 for example, utilizing any of a variety of Wi-Fi SLAM methods. In other implementations, other wireless signal characteristics, signal strength, etc., may be used by various client devices 102 alone or collectively, to determine a particular person's pose based on signals emitted by a client device 102 they carry. Additionally or alternatively, in some implementations, time-of-flight cameras can be used independently as presence sensors 104 to locate the pose of user(s) in an environment.

In many implementations, automated assistant 112 may engage in dialog sessions with one or more users via user interface input and output devices of one or more client devices 102. In some implementations, automated assistant 112 may engage in dialog sessions with a user in response to user interface input provided by the user via one or more user interface input devices of one of the client devices 102. In some of those implementations, the user interface input is explicitly directly to automated assistant 112. For example, a user may speak a predetermined invocation phrase, such as "OK, Assistant," or "Hey, Assistant," to cause automated assistant 112 to begin actively listening.

In some implementations, automated assistant 112 may engage in a dialog session in response to user interface input, even when that user interface input is not explicitly directly to automated assistant 112. For example, automated assistant 112 may examine the contents of user interface input and engage in a dialog session in in response to certain terms being present in the user interface input and/or based on other cues. In many implementations, automated assistant 112 may utilize speech recognition to convert utterances from users into text, and respond to the text accordingly, e.g., by providing visual information in the form of a base image and/or a transformed image, by providing search results, general information, and/or taking one or more response actions (e.g., playing media, launching a game, ordering food, etc.). In some implementations, the automated assistant 112 can additionally or alternatively respond to utterances without converting the utterances into text. For example, the automated assistant 112 can convert voice input into an embedding, into entity representation(s) (that indicate entity/entities present in the voice input), and/or other "non-textual" representations and operate on such non-textual representations. Accordingly, implementations described herein as operating based on text converted from voice input my additionally and/or alternatively operate on the voice input directly and/or other non-textual representations of the voice input.

Each of the client computing devices 102 and computing device(s) operating cloud-based automated assistant components 116 may include one or more memories for storage of data and software applications, one or more processors for accessing data and executing applications, and other components that facilitate communication over a network. The operations performed by one or more computing device 102 and/or automated assistant 112 may be distributed across multiple computer systems. Automated assistant 112 may be implemented as, for example, computer programs running on one or more computers running in one or more locations that are coupled to each other through a network.

As noted above, in various implementations, client computing device 102 may operate an automated assistant client 108. In various implementations, each automated assistant client 108 may include a corresponding speech capture/text-to-speech ("TTS")/speech-to-text ("STT") module 110. In other implementations, one or more aspects of speech capture/TTS/STT module 110 may be implemented separately from the automated assistant client 108.

Each speech capture/TTS/STT module 110 may be configured to perform one or more functions: capture a user's speech, e.g., via a microphone (which in some cases may comprise presence sensor 104); convert that captured audio to text (and/or to other representations or embeddings); and/or convert text to speech. For example, in some implementations, because a client device 102 may be relatively constrained in terms of computing resources (e.g., processor cycles, memory, battery, etc.), the speech capture/TTS/STT module 110 that is local to each client device 102 may be configured to convert a finite number of different spoken phrases—particularly phrases that invoke automated assistant 112—to text (or other forms, such as lower dimensionality embeddings). Other speech input may be sent to cloud-based automated assistant components 116, which may include cloud-based TTS module 118 and/or cloud-based STT module 120.

Cloud-based STT module 120 may be configured to leverage the virtually limitless resources of the cloud to convert audio data captured by speech capture/TTS/STT module 110 into text (which may then be provided to natural language processor 122). Cloud-based TTS module 118 may be configured to leverage the virtually limitless resources of the cloud to convert textual data (e.g., natural language responses formulated by automated assistant 112) into computer-generated speech output. In some implementations, TTS module 118 may provide the computer-generated speech output to client device 102 to be output directly, e.g., using one or more speakers. In other implementations, textual data (e.g., natural language responses) generated by automated assistant 112 may be provided to speech capture/TTS/STT module 110, which may then convert the textual data into computer-generated speech that is output locally.

Automated assistant 112 (e.g., cloud-based assistant components 116) may include a natural language processor 122, the aforementioned TTS module 118, the aforementioned STT module 120, transformation parameters 124, and other components, some of which are described in more detail below. In some implementations, one or more of the engines and/or modules of automated assistant 112 may be omitted, combined, and/or implemented in a component that is separate from automated assistant 112. In some implementations, to protect privacy, one or more of the components of automate assistant 112, such as natural language processor 122, speech capture/TTS/STT module 110, etc., may be implemented at least in part on client device 102 (e.g., to the exclusion of the cloud).

In some implementations, automated assistant 112 generates responsive content in response to various inputs generated by a user of client device 102 during a human-to-computer dialog session with automated assistant 112. Automated assistant 112 may provide the responsive content (e.g., over one or more networks when separate from a client device of a user) for presentation to the user as part of the dialog session. For example, automated assistant 112 may generate responsive content in response to free-form natural language input provided via client device 102. As used herein, free-form input is input that is formulated by the user that is not constrained to a group of options presented for selection by the user.

Natural language processor 122 of automated assistant 112 processes natural language input generate by users via client device 102 and may generate annotated output for use by one or more components of automated assistant 112. For example, the natural language processor 122 may process natural language free-form input that is generated by a user via one or more user interface input devices of client device 102. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. Also, for example, in some implementations the natural language processor 122 may additionally and/or alternatively include a dependency parser (not depicted) configured to determine syntactic relationships between terms in natural language input.

In some implementations, the natural language processor 122 may additionally and/or alternatively include an entity tagger (not depicted) configured to annotate entity references in one or more segments such as references to people (including, for instances, literary characters, celebrities, public figures, etc.), organizations, locations (real and imaginary), and so forth. The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster", references to the same entity based on one or more contextual cues. For example, the coreference resolver may be utilized to resolve the term "there" to "Hypothetical Café" in the natural language input "I liked Hypothetical Café last time we ate there."

In many implementations, one or more components of the natural language processor 122 may rely on annotations from one or more other components of the natural language processor 122. For example, in some implementations, the named entity tagger may rely on annotations from the coreference resolver and/or dependency parsers in annotating all mentions to a particular entity. Also, for example, in some implementations the coreference resolver may rely on annotations from the dependency parser in clustering references to the same entity. In many implementations, in processing a particular natural language input, one or more components of the natural language processor 122 may use related prior input and/or other related data outside of the particular natural language input to determine one or more annotations.

In many implementations, automated assistant 112 can generate dynamic image transformations to display a base image and/or transformed version of the base image. In some additional or alternative implementations, the automated assistant 112 can identify one or more active users, generate image transformations to display for active user(s), and/or generate a base image to project based on the distance of a user from the projected image.

In various implementations, cloud-based annotated assistant components 116 may generate transformation parameters 124. In other implementations, transformation parameters 124 may be generated separately from cloud-based automated assistant components 116, e.g., on client device 102, by automated assistant client 108 and/or on another computer system (e.g., in the so-called "cloud").

In many implementations, transformation parameters 124 can be used by automated assistant client 108 and/or cloud-based automated assistant components 116 to generate a transformed image from base image. For example, transformation parameters 124 can include identification information for a user's position within an environment. Warping parameters (not depicted), can be a specific type of transformation parameters which can be used by automated assistant client 108 and/or cloud-based automated assistant components 116 to warp a base image into a transformed image. Warping parameters may include, for example, one or more of: the pose of a user, the gaze of a user, the facial identification of a user (with approval of the user), the voice identification of a user (with approval of the user), and/or the distance from a projector to the surface an image is projected onto. In some implementations, automated assistant 112 can perform image warping, a linear transformation similar to image rectification (described in more detail below) on transformation parameters 124 to generate a transformed image from a base image and/or an additional base image.

Additionally, in various implementations, a user's pose can be determined via presence sensors 104, and the automated assistant 112 can use the distance from the user (which can be generated from the user's pose) to the projection surface (i.e., the location where the image is projected) to identify a base image to use for that particular user. The information contained in the base image can be dependent on the distance from the user to the projection surface. For example, a base image identified for a user located far from a surface can contain limited information from the user's calendar such as only the next item on the user's calendar. In contrast, a base image identified for a user located near the projection surface can contain more detailed information from the user's calendar such as the user's schedule for the entire day. If the user is close enough to the projection surface to touch the projection, in many implementations, the base image can also contain touch sensitive elements, for example, the ability for the user to scroll through calendar events for the entire week.

Client device 102 and/or cloud-based automated assistant components 116 can be in communication with one or more third party agents (not depicted) hosted by remote device(s) (e.g., another cloud-based component). For instance, a user voice command "order a large pepperoni pizza from Agent X" can cause the automated assistant client 108 (or cloud-based automated assistant component(s) 116) to send an agent command to a third party agent "Agent X". The agent command can include, for example, an intent value that indicates an "ordering" intent determined from the voice command, as well as optional slot values such as "type=pizza", "toppings=pepperoni", and "size=large". In response, the third party agent can provide, to the automated assistant 112, responsive content that includes (or enables generation of) base image(s) relevant to the pizza order. For example, a base image can include graphical representations of the order being confirmed, as well as of a status of the pizza order. As another example, base images can include a video sequence of real time tracking of the pizza delivery driver on a map as the pizza is being delivered. Once these base image(s) are received from the third party agent, the automated assistant client 108 and/or the cloud-based automated assistant components 116 can generate a transformation of the base image(s) and a transformed image can be projected onto the wall for the user.

Figure 2B:
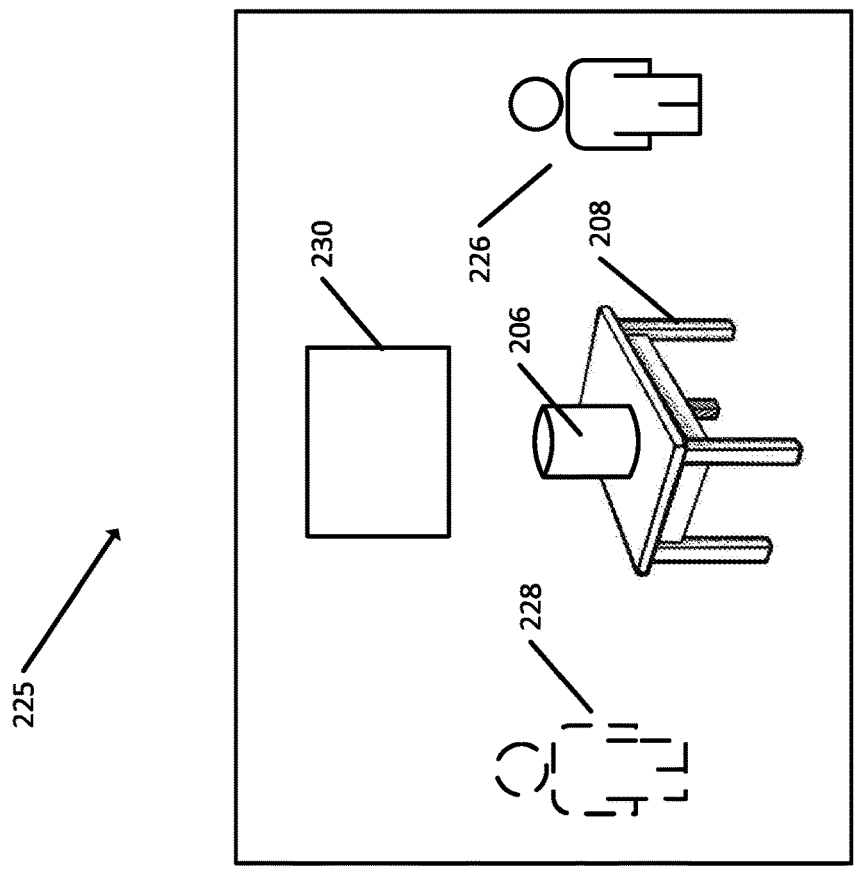
FIG. 2B is a diagram illustrating an example scene of a user in a second pose in a room looking at an image projected at the same location onto the wall by a projector using an automated assistant.
Figure 2A:
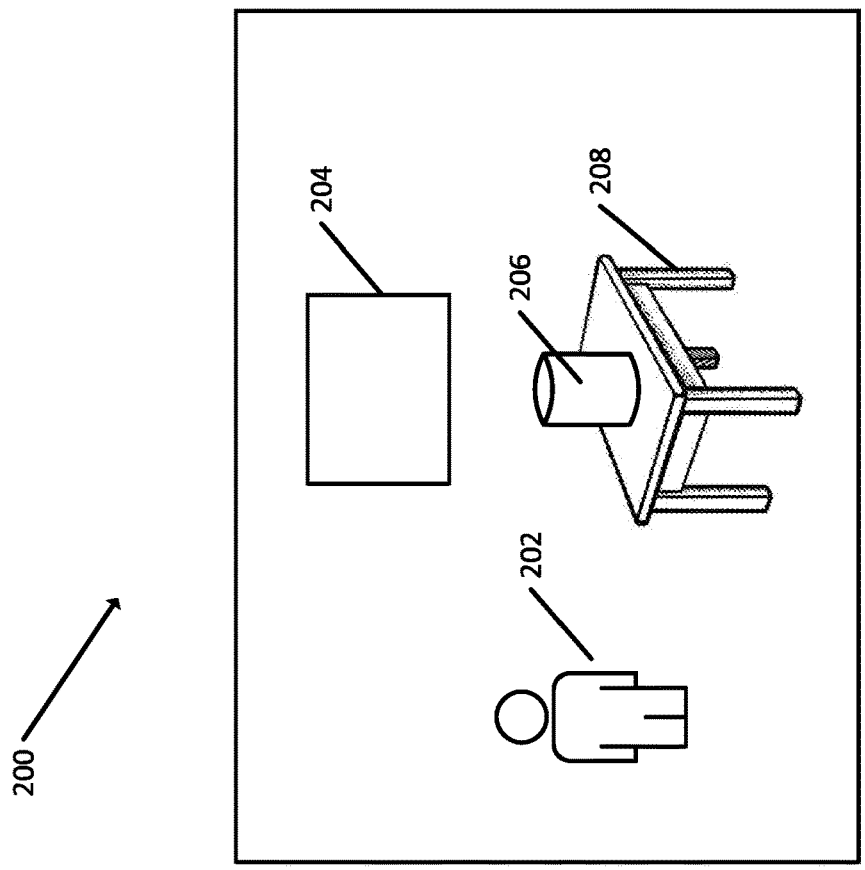
FIG. 2A is a diagram illustrating an example scene of a user in a first pose in a room looking at an image projected onto a wall by a projector using an automated assistant.

An example of a user viewing an image projected onto a wall with respect to different user locations is illustrated in FIGS. 2A and 2B. Image 200 contains a scene of a room at a first time and is illustrated in FIG. 2A. Image 200 contains user 202, projected image 204, client device 206 (that includes an integrated projector and/or is in communication with a locally accessible separate projector), and table 208. It will be understood that that image 200 is merely illustrative and for example the client device and/or projector can be separate devices, the client device and/or projector can be on a surface other than a table such as a desk, a dresser, and/or mounted onto surfaces such as a wall and/or ceiling, more than one client device can be present within the room, more than one projector can be within the room, and/or more than one user can be in the room. Client device 206 can determine the pose of user 202. If client device 206 determines the user 202 is an active user, the client device can project a variety of images 204 for the user including a base image and/or a transformed image that is a transformation of the base image.

The same room captured at a second time is illustrated in FIG. 2B. Image 225 is a scene of the room captured at a second time. Image 225 contains the same client device 206 (that includes an integrated projector and/or is in communication with a locally accessible separate projector) and table 208, but the pose of the user has changed to a second pose 226. As an illustrative example, the user has moved to the right, from previous pose 228, to the second pose 226. Client device 206 can detect the user in the second pose 226 and make a determination if the user is an active user in the second pose. If the user is an active user in the second pose, projected image 230 can be projected onto the wall for the user in the second pose 226. Projected image 230 can be projected onto the same position of the wall as projected image 204 despite any change of content within the images themselves through image transformation processes. In a variety of implementations, contents of projected image 230 can change as user moves to the second pose 226. For example, projected image 204 can be a first transformed image and projected image 230 can be a second transformed image both of the same base image. In other words, client device 206 can generate image transformations such that the user in the first pose 202 and the user in the second pose 226 will perceive the same projected image even though the perspective of the user has changed relative to the position to the image on the wall has changed. In many implementations, client device 206 can use a base image and can perform image transformations to project transformed images for both user poses such that projected image 204 for user pose 202 is a first transformed image and projected image 230 for the user in the second pose 226 is a second transformed image. In contrast, if user 202 has a viewpoint perpendicular to (e.g., directly in front of) image 204, client device 206 can project the untransformed base image as projected image 204 (and similarly computing device 206 can project a transformed image as projected image 230 for the user in the second pose 226).

Figure 2D:
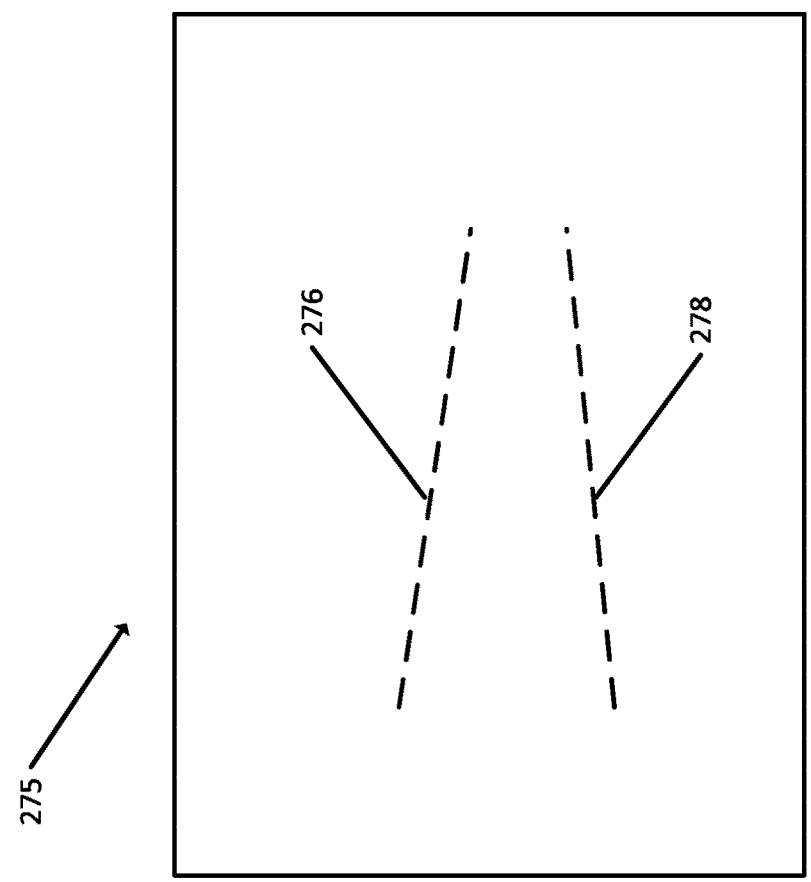
FIG. 2D illustrates an example of the projected image of FIG. 2C, but as perceived by a user from a perspective that is not directly perpendicular to the projected image.
Figure 2C:
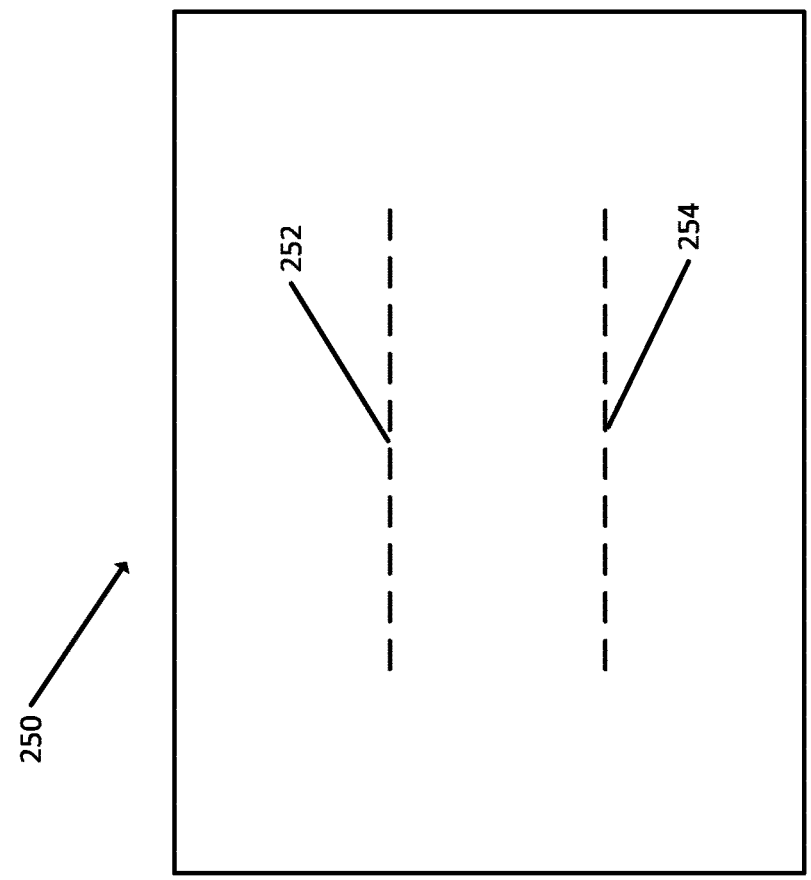
FIG. 2C is a diagram illustrating an example of a projected image, as perceived by a user from a perspective that is directly perpendicular to the projected image.

Example images further illustrating a base image and the same base image without dynamic image transformation viewed by a user from a non-perpendicular angle (e.g., from the side) are illustrated in FIGS. 2C and 2D. In many implementations, a base image can be directly projected onto a wall for a user who has a perspective of the image directly perpendicular to the wall. Additionally, a base image can be transformed using a variety of dynamic image transformations such that a client device can project a transformed image that will appear to look as substantially similar (if not identical) to the base image as the user changes perspective from location of the projected image within the room.

FIG. 2C contains image 250 which contains dashed line 252 and dashed line 254. Dashed line 252 and dashed line 254 are parallel lines (i.e., likes that are equidistant and will never meet). In many implementations, image 250 can be an example of a base image used by a client device which can be processed using image transformations such that dashed line 252 and dashed line 254 can appear parallel to a user when projected onto a wall regardless of the pose of a user in the room. For example, when a user is viewing the projected image from a non-perpendicular angle (e.g., the side) image transformations can make the lines in the transformed base image still appear parallel. Additionally, when image 250 is projected onto a surface by a client device and viewed by a user from a direction perpendicular to (e.g., directly in front of) a surface as a base image, dashed line 252 and dashed line 254 appear parallel.

In contract, FIG. 2D contains image 275 made of dashed line 276 and dashed line 278. Dashed line 276 and dashed line 278 are non-parallel and slant towards each other on the left hand side of the image. In a variety of implementations, lines 276 and 278 are an example of how a base image of parallel lines (for example if the image 250 containing dashed parallel lines was utilized as a base image) could be viewed by a user from a perspective in the room other than perpendicular to the image if no image transformation was used on the image projection. As an example, a pair of lines closer on the right side and further apart on the left side can indicate a user is standing to the right of a base image of parallel lines without image transformation. This user pose can be similar to the user in the second pose 226 after the user has moved to the right side of the room in FIG. 2B.

Client device 206 can generate an image transformation on a base image similar to the parallel lines of image 250 in FIG. 2C such that a user in second pose 226 will see a transformed image generated by client device 206 with parallel which looks like image 250 instead of the non-parallel lines in image 275 the user would normally see from a non-parallel viewing position as illustrated in FIG. 2D. Additionally, the user in the second pose 226 will see an image projected that is the same (or substantially similar) size as the base image and that is in the same (or substantially similar) location as the base image.

Figure 3:
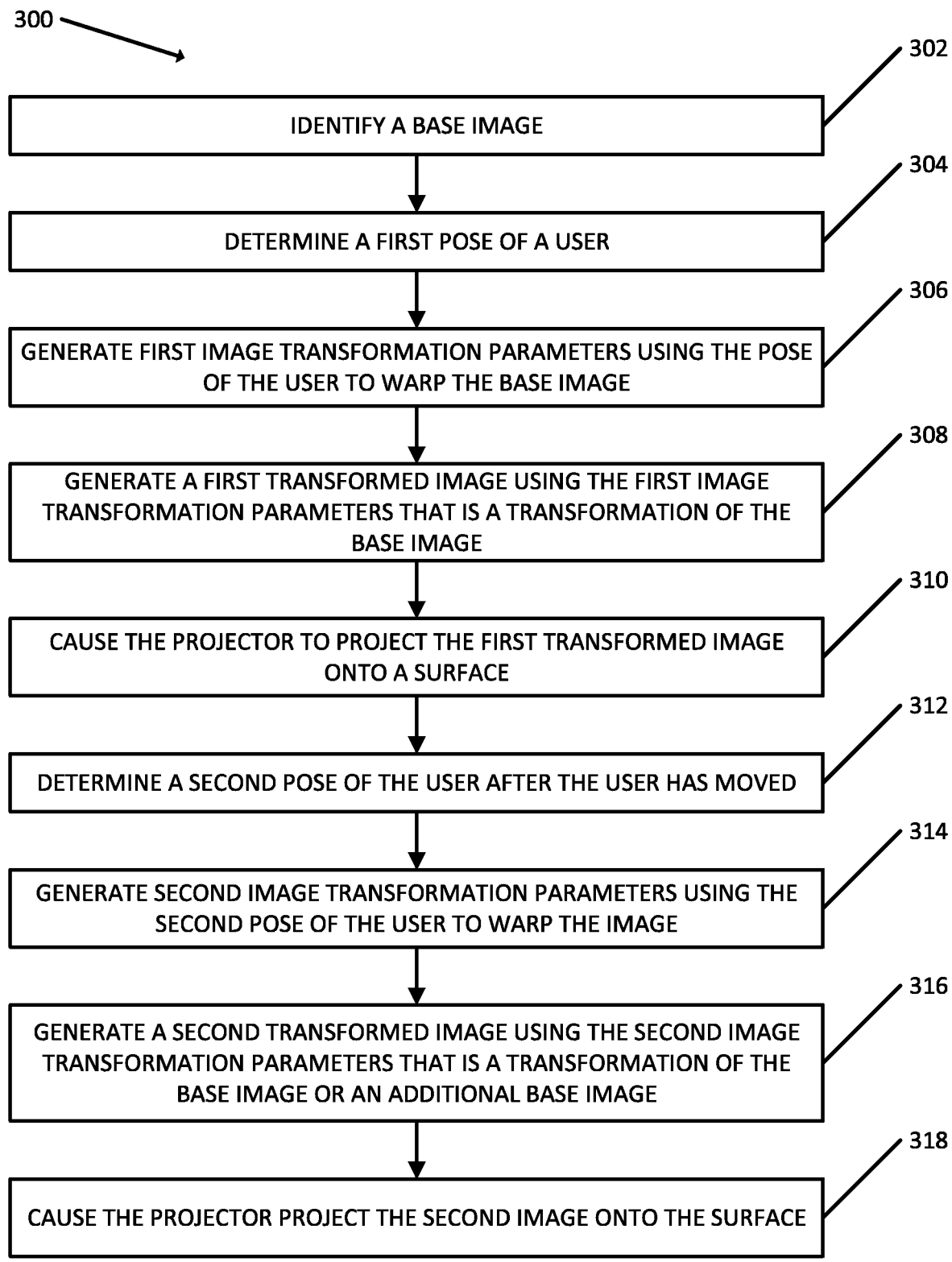
FIG. 3 is a flowchart illustrating an example process according to implementations disclosed herein.

A process for dynamic image transformation using image warping in accordance with various implementations is illustrated in FIG. 3. The process 300 can be performed by one or more client devices, and or any other apparatus capable of interacting with an automated assistant. The process includes identifying (302) a base image. The base image can be used by an automated assistant (at the client device and/or at remote device(s)) to generate a transformed image in dependence on a pose of a user. For example, a base image can include any of a variety of information that a client device can cause a projector to project for presentation to user, such as weather information for a particular day. In many implementations, a user can request information that can be included in a base image through interaction with the client device through verbal, textual, graphical, and/or visual input to the client device. For example, a user can ask the client device "OK Assistant—what is the weather tomorrow" and a base image can be identified containing weather information for the following day. Moreover, base images can be provided to a client device by a third party agent (optionally provided via the cloud-based automated assistant component(s) 116). For example, if a user orders a delivery from a restaurant, the third party agent associated with the restaurant can send the automated assistant a base image which can include status updates relating to the delivery. Yet further, in various implementations the automated assistant can generate base images and provide them for projection independent of explicit user input. For example, an image that contains a weather forecast can be projected in response to detecting presence of a user, but without explicit input from the user.

A first pose of a user can be determined (304) within a room. A variety of sensors in the client device, such as presence sensors 104 in FIG. 1, can be used to determine the first pose of the user such as a microphone, a camera, an infrared camera, a time of flight camera, and/or a touch screen display on the client device. For example, a client device can use a camera to detect a user and generate the pose of the user within the room. In several implementations, a client device with many sensors can determine which sensors to use individually and/or in combination based on previously known information regarding the pose of a user. For example, when little information is known about a user's pose location, a sensor which gathers information about the entire room can be used such as a time of flight camera. Alternatively, if a user is interacting the client device at the touch screen, it can safely be assumed the user is close to the client device, and a shorter range sensor could be used to determine the first pose of the user. Additionally or alternatively, sensors integrated into third party agents can be used to determine a pose of a user. It will be understood that these examples are merely illustrative any of a variety of ways to detect user pose in a room can be utilized as appropriate in accordance with various implementations.

First image transformation parameters can be generated (306) using the first pose of the user to warp the base image. Image warping can include a linear transformation process which can use image warping parameters such as a user's pose, position, gaze, facial identification (with approval of the user), voice identification (with approval of the user) and/or distance from the projector to the surface the image is projected onto to generate image transformation parameters. A process for determining a transformation to warp an image in accordance with many implementations will be discussed below in FIG. 4. In many implementations, first image transformation parameters can include for example (but are not limited to) base image data, precalculated image transformation data for a base image, first user pose data, and/or any other information relevant to generating a transformed image. In several implementations, first image transformation parameters can include image warping parameters.

A first transformed image can be generated (308) using the first image transformation parameters where the first transformed image is a transformation of the base image. In general, a transformed image can differ from the base image in content, but is generated in such a way that it appears to be substantially similar in size and location to the base image when projected onto the surface. In many implementations, an image transformation is not necessary when the first pose of the user is viewing the image perpendicular to (e.g., directly in front of) the surface the image is projected onto.

In this specific example, first image transformation parameters can indicate to the client device that the generation of a first transformed image is unnecessary and the base image will take the place of the first transformed image. Furthermore, the base image, being identical to itself, will take up an identical size and position on the wall. In many implementations, while a transformed image will differ from its base image counterpart, it can be of the same size as the base image and/or can, when projected, be projected in the same location and as the same size as would the base image. For example, when a base image and a transformed image are projected they can be of an identical size on a projection surface and in identical locations on the projection surface. In some implementations, the transformed image is projected in a "substantially similar" position as the base image. For example, the first transformed image and the base image can be identical in size, but two images are not projected onto exactly the same position of the wall and the transformed image can take up 95% of the same position on the wall as the base image. Alternatively, the transformed image can be slightly smaller than the base image, and while the transformed image is taking up the same position on the wall, because the transformed image is slightly smaller it is only taking up 90% of the wall space of the base image (but is not taking up any wall space outside of the area of the original base image). Additionally, a transformed image can be slightly larger than a base image and can take 105% of the wall space of the base image and still take up a substantially similar position on the wall.

The projector can be caused (310) by the client device to project the first transformed image onto a surface. The projector can be integrated within a client device similar to client device 102 and/or a separate projector similar to projector 106. The surface can include various areas with in a room including a wall, the ceiling, and/or the floor. For example, if the first pose of a user is determined to be reclining on a couch, projecting information on the ceiling (instead onto the wall) might be a more useful location for the user to view the projected transformed image.

A second pose of the user can be determined (312) after the user has moved. User movement can be determined using many of the same sensors used to detect the first pose of the user in step (304) including a microphone, a camera, an infrared camera, a time of flight camera, and/or a touch screen display on the client device. For example, a microphone that detected a user speaking in one pose in the room can detect when the user's voice is coming from a different direction, and thus the user has moved within the room. Once a client device has determined the user has moved, the second pose of the user can be determined in a manner similar to determining the first pose of the user in step (304) including using a sensor and/or a combination of sensors.

Second image transformation parameters can be generated (314) using the second pose of the user to warp the image. As previously described, image warping can be a linear transformation process which can utilize image warping parameters to generate image transformation parameters. A process for determining a transformation to warp an image in accordance with many implementations will be discussed below in FIG. 4. In some implementations, second image transformation parameters can include for example (but are not limited to) base image data, precalculated image transformation data for the base image, first user pose data, second user pose data, and/or any other information relevant about a user to generate a transformed image. In many implementations, second image transformation parameters can include image warping parameters.

A second transformed image can be generated (316) using the second image transformation parameters where the second transformed image is a transformation of the base image or an additional base image. Generating a second transformed image can be performed in a manner similar to step (308) described above. Additionally or alternatively, an additional base image can be used in place of the base image to generate the second transformed image when a base image changes over time. For example, a base image of a projected calendar event image can change once the event has ended and an additional base image for the next calendar event image can be projected. Additionally, individual frames of a video sequence can make a corresponding sequence of base images. In this case the base image can change to an additional base image independent of user movement and additional image transformations can be calculated for a first pose of the user for additional base images.

The projector can be caused (318) by the client device to project the second transformed image onto the surface. The second image can be projected in a manner similar to the projection of the first transformed image in step (310) above. However, if the client device detects the viewpoint of the user has substantially changed and a different surface would be preferable, the client device can instruct the projector to project the second transformed image onto a different surface. For example, if the first pose of a user is determined to be reclining on a couch and the first transformed image is projected onto the ceiling, and the client device detects the user gets up from the couch and has moved within the room as the second pose, the second transformed image can be projected onto a wall instead of the ceiling. Similarly, for example if a user if facing north for the first pose, the first transformed image can be projected onto the North wall. In some implementations, if the user moves to face south for the second pose, the second transformed image can be projected onto the south wall.

Figure 4:
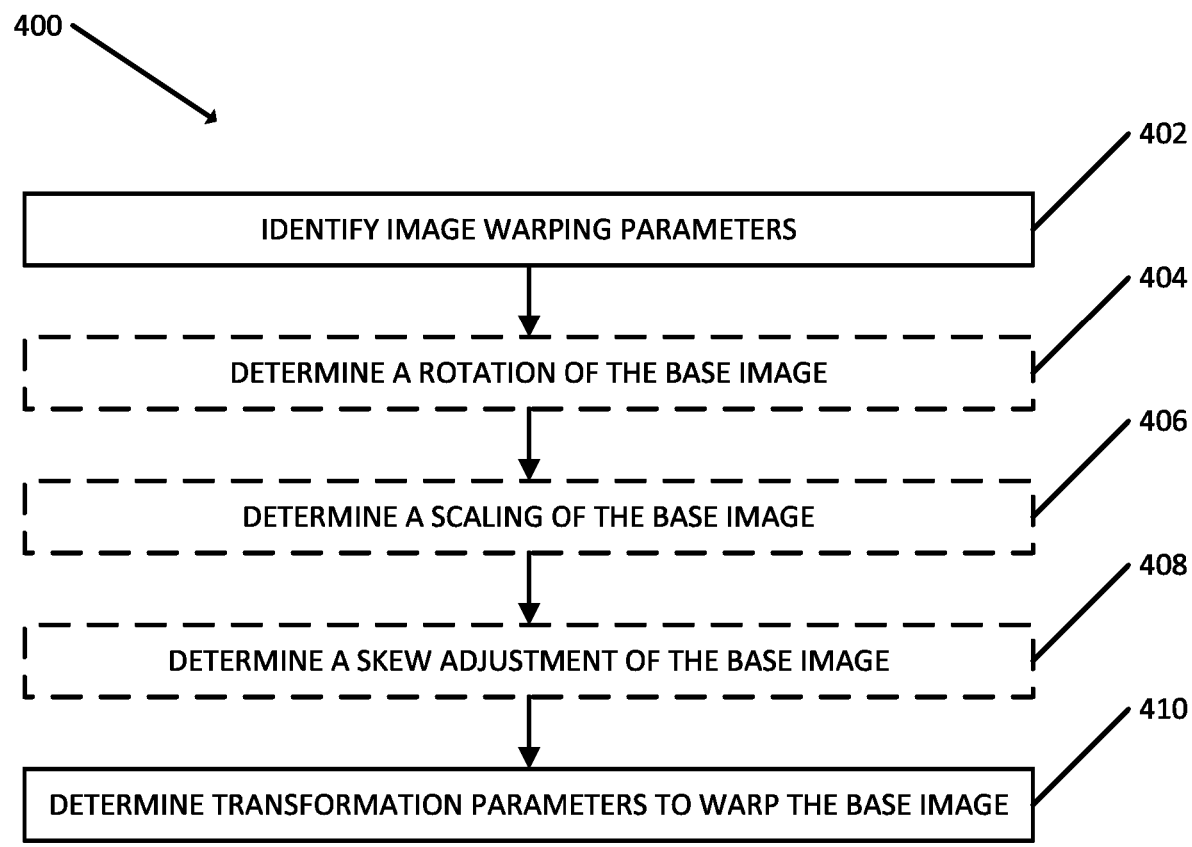
FIG. 4 is a flowchart illustrating an example process according to implementations disclosed herein.

A process for determining a transformation to warp an image in accordance with various implementations is illustrated in FIG. 4. The process 400 can be performed by one or more client devices, and/or any other apparatus capable of interacting with an automated assistant for generating image transformation parameters by image warping. The process 400 can include identifying (402) image warping parameters. Image warping parameters can include (but are not limited to) the pose of a user, the gaze of a user, the facial identification of a user (with approval of the user), the voice identification of a user (with approval of the user), the distance from a projector to the surface an image is projected onto, and/or any other of a variety of user and/or hardware related parameters which can be used as image warping parameter. In many implementations, a client device can use a single image warping parameter such as the gaze of the user, to determine a transformation to warp an image. Alternatively, in several implementations, a client device can use a combination of image warping parameters.

Individual sensors available to a client device can impact which warping parameters are available to the client device. For example, if a client device has sensors which can determine the gaze of a user, the client device can use gaze as an image warping parameter. Additionally, in some implementations, a client device can receive data to use as warping parameters from sensors in third party agents such as a "smart" thermostat and/or other "smart" devices located within the room.

Image warping parameters can be identified by a client device individually and/or in combination. In various implementations a combination of warping parameters can be identified by particular sensors available to the client device, the client device itself can determine the combination, and/or the user can identify image warping parameters by predetermining which combination of warping parameters the client device should use. For example, a client device can use the gaze of a user as a warping parameter. However, the client device can make the choice to not the gaze of the user as a warping parameter at night when the lights are off in the room and thus the client device can have a harder time determining the gaze of a user, and instead the client device can identify other warping parameters such as determining a position of a user using voice identification (which is often less sensitive to lighting conditions in the room).

Determining transformation parameters to warp a base image can depend on (but are not limited to) which warping parameters and the values of data contained in the warping parameters which are used by the client device. In many implementations, different adjustments and/or combinations of adjustments can be made using image warping parameters to generate image transformation parameters which can warp a base image as an image transformation. For example, a base image with a particular set of image warping parameters can require only one adjustment to determine transformation parameters to such as only requiring a vertical rotation of the base image. In contrast, in several implementations, when a user is in a different position, a base image can have a different set of image warping parameters and can require a combination of adjustments such as a horizontal rotation of the base image and a scaling of the base image. It will be understood that these examples are merely illustrative any number of combinations of image adjustment combinations can be made by a client device as appropriate to determine transformation parameters in accordance with various implementations.

A rotation of the base image can optionally be determined (404) by the client device. Image rotations can spin an image on the same plane as the wall the image is projected onto (i.e., on a plane parallel with the projection surface). For example, a base image can be a rectangle that when viewed by the user perpendicular to (e.g. directly in front of) a square wall, the rectangular base image has lines parallel with the ceiling, floor, and walls. Image warping parameters can determine an appropriate rotation of the base image to determine transformation parameters to generate a transformed image that is also a rectangle with lines parallel to the ceiling, floor, and walls when viewed from the pose of the user from a non-perpendicular pose (e.g., to the side of) of the square wall.

A scaling of the base image can optionally be determined (406) by the client device. Image scaling adjusts the size of an image. Additionally or alternatively, image warping parameters can determine an appropriate scaling of a base image to generate image warping parameters which can increase and/or increase the size of the base image when image transformation parameters are utilized to generate a transformed image such that the transformed image takes up the same and/or substantially similar amount of space of the wall when projected as the base image when viewed from the pose of the user from a non-perpendicular pose.

A skew adjustment of the base image can optionally be determined (408) by the client device. In general, a skew image is an image at an oblique angle (i.e., at a slant). Image warping parameters can determine how to skew an image to generate image warping parameters to use in generating a transformed image which can change the angles within the base image (i.e., slant portions of the image) such the determined transformation parameters can generate a transformed image that appears non-skewed when viewed from the pose of the user from a non-perpendicular pose.

Transformation parameters to warp the base image as an image transformation can be determined (410) by the client device. As previously described, the number of image adjustments necessary to determine transformation parameters to warp a particular base image as an image transformation with a particular set of image warping parameters can vary based on a number of factors including the base image and/or one or more of the warping parameters.

In many implementations, image warping can be viewed in some ways as similar to image rectification with various differences. Image rectification generally projects two images, each image having a different optical viewpoint, onto a common image plane. A matching pair of transformations, H and H' can be used to rectify the pair of images. In contrast, while image warping shares two images (a base image and a transformed image), only one image in the pair (the transformed image) is being transformed. The base image never changes and a single base image can be associated with many image transformations (and thus many transformed images) as the "optical viewpoint" of the user such as when the pose of the user within the room changes. Image warping generates a single image transformation using a known "optical viewpoint" (which in this context can be viewed as determined image warping parameters) of a user to match a transformed image to a known base image. In many implementations, similar mathematical techniques used in image rectification (sometimes with slight modifications) can be utilized in image warping including planar rectification, cylindrical rectification, and/or polar rectification. For example, a base image can contain a calendar event for a user. Image warping can generate a single image transformation (in contrast to the matching pair of image transformations generated with image rectification) using a transformation parameter such as the pose of the user within a room in place of the "optical viewpoint" to generate a transformed image to correspond with the known base image for the user. Additionally or alternatively, other transformation parameters can be utilized individually and/or in combination for example, the pose and the gaze of a user can be utilized as the "optical viewpoint" of the user when generating the single image transformation to generate a transformed image to correspond with the known base image.

Figure 5A:
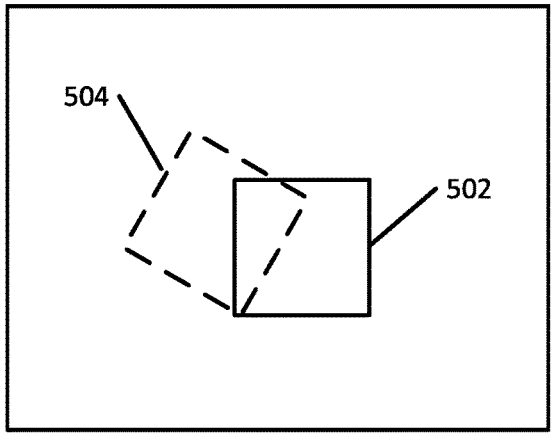
FIGS. 5A, 5B, 5C, and 5D are diagrams illustrating examples of image processing adjustments.
Figure 5A:
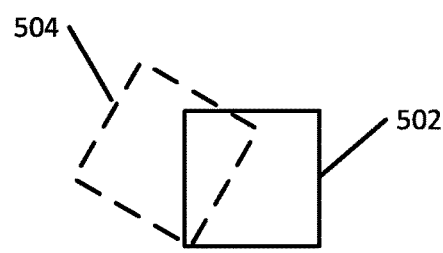

To further illustrate image adjustments that can be utilized in determining transformation parameters to warp a base image, examples of a variety of image adjustments are illustrated in FIGS. 5A-5D. Image 500 contains an example of image rotation as illustrated in FIG. 5A. Image 500 contains a square 502. A rotation to the left of square 502 is illustrated as rotated square 504. It will be understood that this is merely an illustrative example, and rotated square 504 could be located in any of a variety of positions where rotated square 504 turns around an axis within image 500.

Figure 5B:
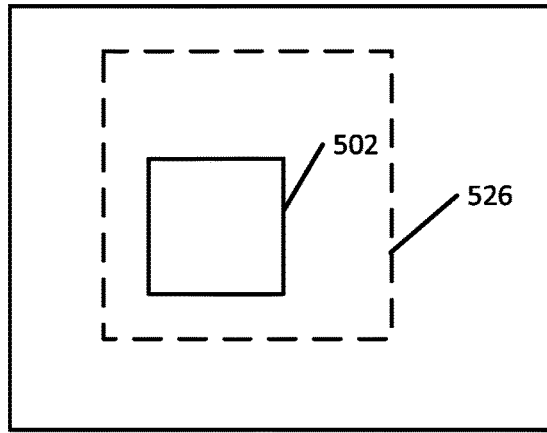
Figure 5B:
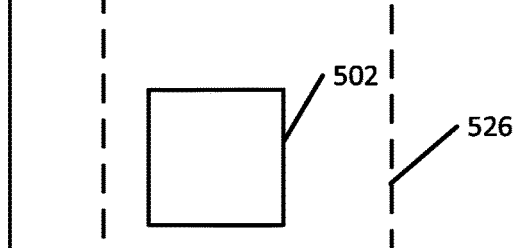

Image 525 contains an example of image scaling as illustrated in FIG. 5B. Image 525 similarly contains square 502. However, square 502 is scaled to be larger and is illustrated as scaled square 526. Scaled square 526 is merely an illustrative example, as scaling can increase or decrease the size of an object.

Figure 5C:
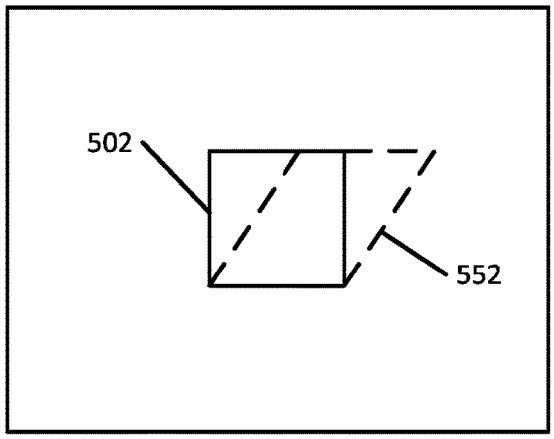
Figure 5C:
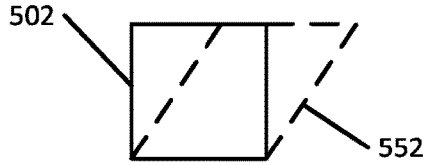

Image 550 contains an example of image skewing as illustrated in FIG. 5C. Square 502 is similarly contained in image 550. A skew transformation is performed on square 502 where square 502 is skewed to the right as skewed square 552. This example of image skewing is merely illustrative and skewing can occur in any direction including to the right, to the left, up, and/or down.

Figure 5D:
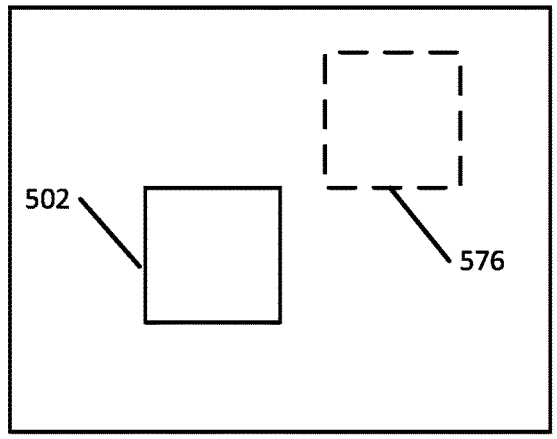
Figure 5D:
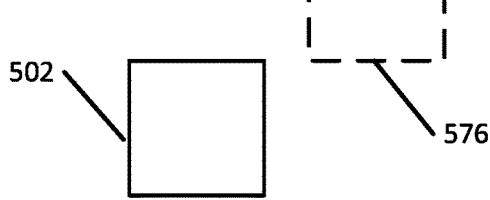

Image 575 contains an example of image translation as illustrated in FIG. 5D. Square 502 as illustrated in image 575 is translated up and to the right to generate translated square 576. This example is merely illustrative and image translations can occur in any direction. Additionally, image transformations discussed in FIGS. 5A-5D can be performed on an image individually and/or in any of a variety of combinations.

Figure 6:
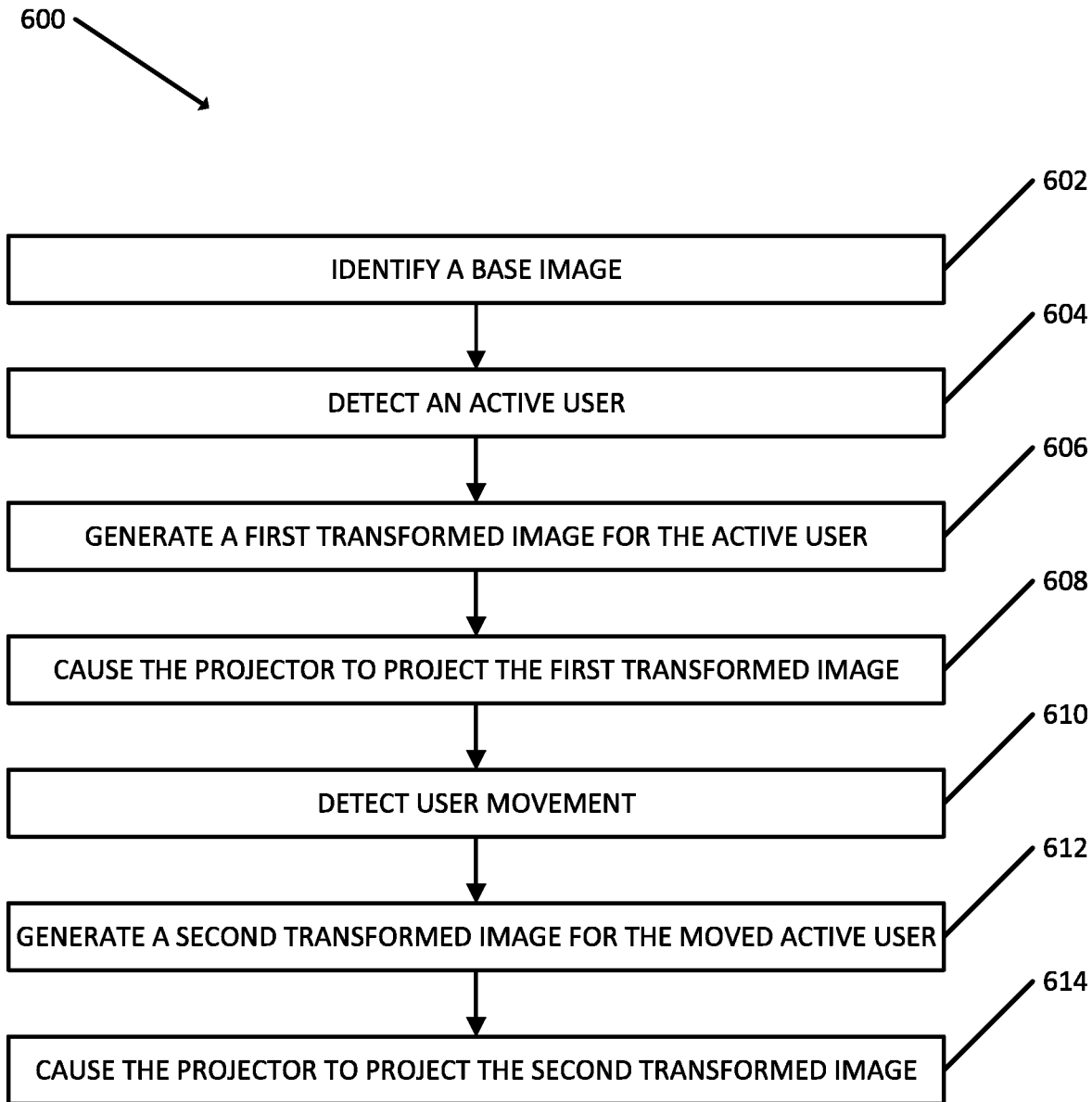
FIG. 6 is a flowchart illustrating an example process according to implementations disclosed herein.

A process for dynamic image transformation including detecting an active user in accordance with various implementations is illustrated in FIG. 6. The process 600 can be performed by one or more client devices, and/or any other apparatus capable of interacting with an automated assistant. The process includes identifying (602) a base image. As described above, a base image can be transformed in dependence on a pose of a user to generate a transformed image. In several implementations, identification of a base image can be performed in a manner similar to step (302) in FIG. 3.

An active user can be detected (604) by the client device. In some implementations, an active user is a user who is actively engaged with the automated assistant, and can be detected in a number of ways including by movement, location, pose, facial identification (with approval of the user), voice identification (with approval of the user), and/or gaze. Active engagement can include viewing a projecting image, listening to rendered audible content provided by the automated assistant, and/or providing input to the automated assistant (e.g., voice input, touch input, gestures, etc.). Sensors such as any of a variety of sensors included in presence sensors 104 and/or sensors included in third party agents such as "smart" devices can collect sensor data to detect an active user. For example, a microphone detecting a user giving the client device a command "OK Assistant—show me my calendar for tomorrow" could be identified as an active user. Additionally, a camera detecting a user looking at an image projected onto a surface by the client device based on the user's gaze can be identified as an active user. In many implementations, a combination of techniques can be combined to detect an active user such as identifying pose and facial identification (with approval of the user) of someone in a room to detect the person is an active user. Additionally, multiple active users can be detected by a client device in the same room. Detecting an active user can map the detected active user to a user profile or some other sort of identification of the user. Additionally or alternatively, detecting an active user can indicate only that an active user is engaged with the automated assistant.

A first transformed image can be generated (606) for the active user by the client device. Any of a variety of dynamic image transformations can be used to generate the first transformed image including image warping. In many implementations, generating a first transformed image can performed in a manner similar to steps (304)-(308) of FIG. 3.

The client device can cause (608) the projector to project the first transformed image onto a surface. In a variety of implementations, the first transformed image is a transformation of the base image. Projecting the first transformed image can be performed in a manner similar to step (310) of FIG. 3 including using a projector integrated with the client device and/or using a separate projector.

User movement can be detected (610) by the client device. In some implementations, the detection of movement can be performed in a manner similar to determining user movement in step (312) of FIG. 3. Additionally, in a variety of implementations, threshold of movement can be met before a client device determines the second pose of the user. For example, if a user moves less than a millimeter, it is unlikely this small amount of movement will generate a new transformed image that is different enough than the first transformed image to be worth generating, and it can save system resources to wait until a user moves a greater distance before making a determination of the second pose of the user. On the other hand, if a user moves 3 meters to the right similar to how the user moved to second pose 226 to the left in FIG. 2B, a second transformed image can be substantially different than the first transformed image (depending on the content of the image). This can be especially true in implementations where gaze is being utilized to determine and/or as part of determining user pose, as user's eyes frequently make very small shifts. Computational resources could be saved if a threshold requiring a larger shift in gaze is required before a second transformed image for the active user is generated. Alternatively, in many implementations when user gaze is being utilized, any projected images can be stabilized using a variety of image processing techniques as a way to compensate for these small shifts a user's eyes are making.

A second transformed image can be generated (612) for the moved active user by the client device. Any of a variety of dynamic image transformations can be used to generate the second transformed image including image warping. In some implementations, generating a second transformed image can be performed in a manner similar to steps (312)-(316) of FIG. 3.

The client device can cause (614) the projector to project the second transformed image onto the surface. In many implementations, the second transformed image is a transformation of the base image or is a transformation of an additional image. Projecting the second transformed image can be performed in a manner similar to step (608) and/or step (318) of FIG. 3.

Figure 7:
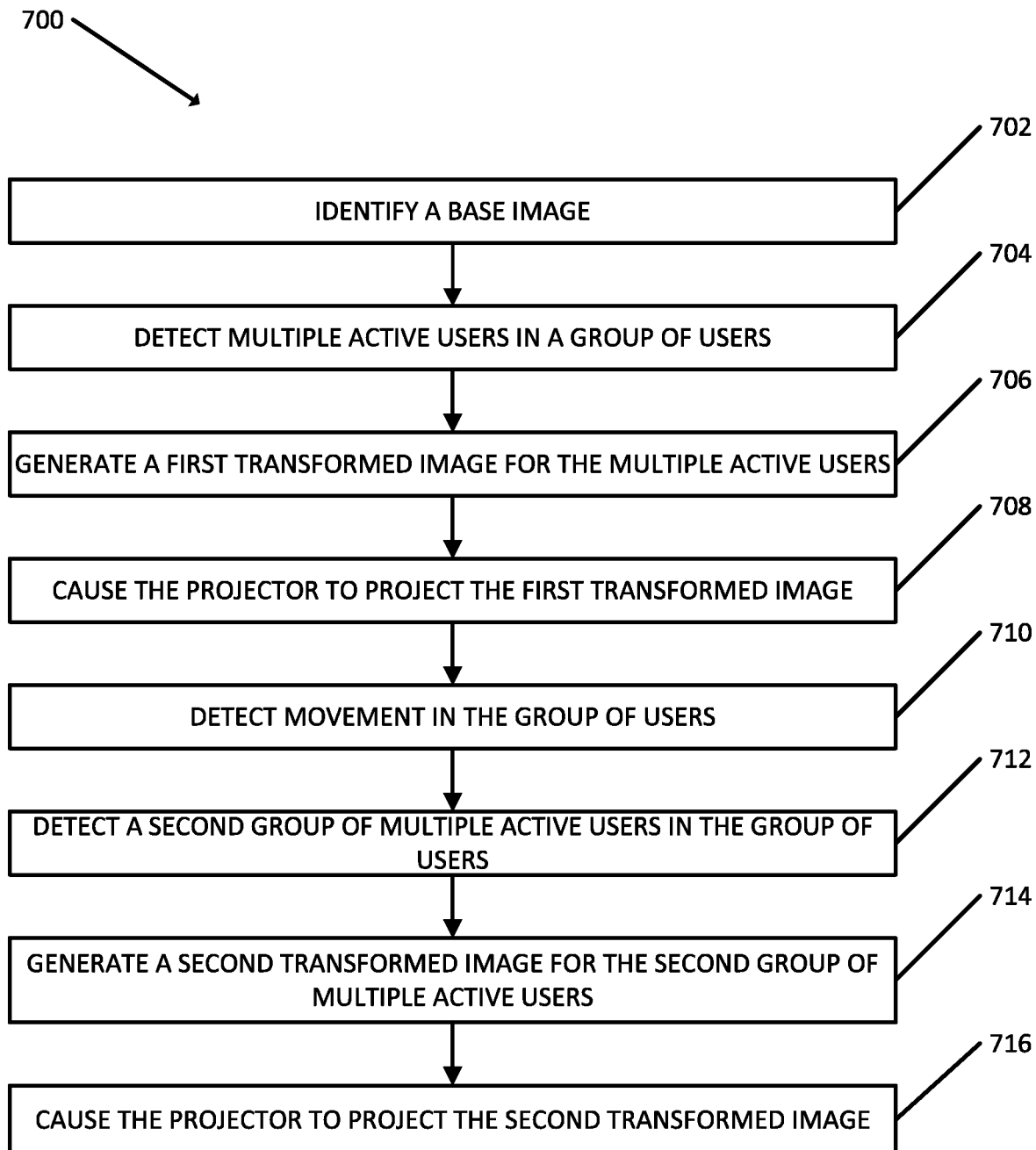
FIG. 7 is a flowchart illustrating an example process according to implementations disclosed herein.

A process for dynamic image transformation for multiple active users in accordance with various implementations is illustrated in FIG. 7. The process 700 can be performed by one or more client devices, and/or any other apparatus capable of interacting with an automated assistant. The process includes identifying (702) a base image. As described above, a base image can be transformed in dependence on a pose of a user to generate a transformed image. In several implementations, identification of a base image can be performed in a manner similar to step (302) in FIG. 3.

Multiple active users in a group of users can be detected (704) by a client device. In various implementations, many people can be in a room, but not all of them can be actively engaged with the client device. For example, a room can have two users and neither user is engaged with the client device (and thus the room has no active users), one of the two users can interacting with the client device and be an active user, and/or both of the two users can be engaged with the client device active users. In several implementations, multiple active users can be detected in a manner similar to how individual active users can be detected in step (604) of FIG. 6. Alternatively, multiple active users can be detected by sensors in groups, and or all active users can be detected in a room simultaneously. For example, sensors integrated into a client device could detect a cluster of active users in the same portion of the room at the same time. Moreover, some types of sensors could process an entire room at the same time and could detect all active users in a room simultaneously. For example, a camera with a 360 degree view can detect which users are looking at a projected image in an entire room and thus detect active users simultaneously. Additionally, a combination of sensors can be used to detect a group of active users. For example, furniture in a room can block a camera from detecting one particular active user, but a microphone could be used to detect voice commands to the automated assistant from the user behind the furniture to determine that user is in the group of active users. It should be readily appreciated that these examples are merely illustrative and any of a number of ways to detect active users can be utilized in accordance with various implementations.

A first transformed image can be generated (706) for the multiple active users by the client device. Any of a variety of dynamic image transformations can be used to generate the first transformed image including image warping. In some implementations, generating a first transformed image can be performed in a manner similar to generating an image for a single active user such as steps (304)-(308) of FIG. 3. Additionally, image warping parameters can take multiple user poses into account when generating image warping to generate a first transformed image. For example, if all the active users are clustered in a single area of a room, a client device can decide to treat the multiple active users in a way similar to a single active user when generating a transformed image. Alternatively, if most active users are clustered in a single area of a room, and a single active user is in a second area of the room, the client device might largely ignore the active users in the second area of the room and still generate a transformed image in a way similar to a single active users. In some implementations, if active users are more equally spread out throughout the room, the client device can make decisions during the image warping process to generate the first transformed image. For example, the client device could combine the poses of multiple active users in a meaningful way to generate a pose which can take the place of a single active user pose for use in generating a first transformed image. For example the poses of multiple active users in a room can be averaged into a single pose. While this might not generate the best first image transformation for any individual active user, it can generate the best first image transformation for the group of users as a whole. Additionally, in some implementations, a client device can perform a weighted averaging of multiple active users, giving more weight to the pose of predetermined users who can be identified using facial identification (with approval of the user) and/or voice identification (with approval of the user). For example, if the first transformed image is an event from a group calendar, the client device can determine which active users have access to that group calendar, and give greater weight to their pose when generating a weighted averaging of multiple active users. In many implementations, there can be no "best" first transformed image to display for the entire group of active users and a client device can simply display the base image in place of a transformed image.

The client device can cause (708) the projector to project the first transformed image onto a surface. In some implementations, the first transformed image is a transformation of the base image. Projecting the first transformed image can be performed in a manner similar to step (310) of FIG. 3 including using a projector integrated with the client device and/or using a separate projector.

Movement can be detected (710) in the group of users by the client device. In some implementations, the detection of movement in a group of users can be performed in a manner similar to determining user movement in step (312) of FIG. 3. Additionally, in many implementations, a threshold of movement can be met movement is detected in the group of users in a manner similar determining a threshold of movement in a user in step (610) of FIG. 6.

A second group of multiple active users can be detected (712) by the client device. In many implementations, detecting a second group of multiple active users can be performed in a manner similar to detecting multiple active users in step (704). Active users in the second group of active users can be different than the active users in the first group. However, there can be overlap between active users in the two groups of active users (but it should be noted it is not a requirement to have any overlap between active users in the first group and active users in the second group).

A second transformed image for the second group of multiple active users can be generated (714) using the client device. In various implementations, generating the second transformed image can be performed in a manner similar to generating the first transformed image for the multiple active users described in step (706).

The client device can cause (716) the projector to project the second transformed image onto the surface. In many implementations, the second transformed image is a transformation of the base image or is a transformation of an additional image. Projecting the second transformed image can be performed in a manner similar to step (614) and/or step (318) of FIG. 3.

Figure 8B:
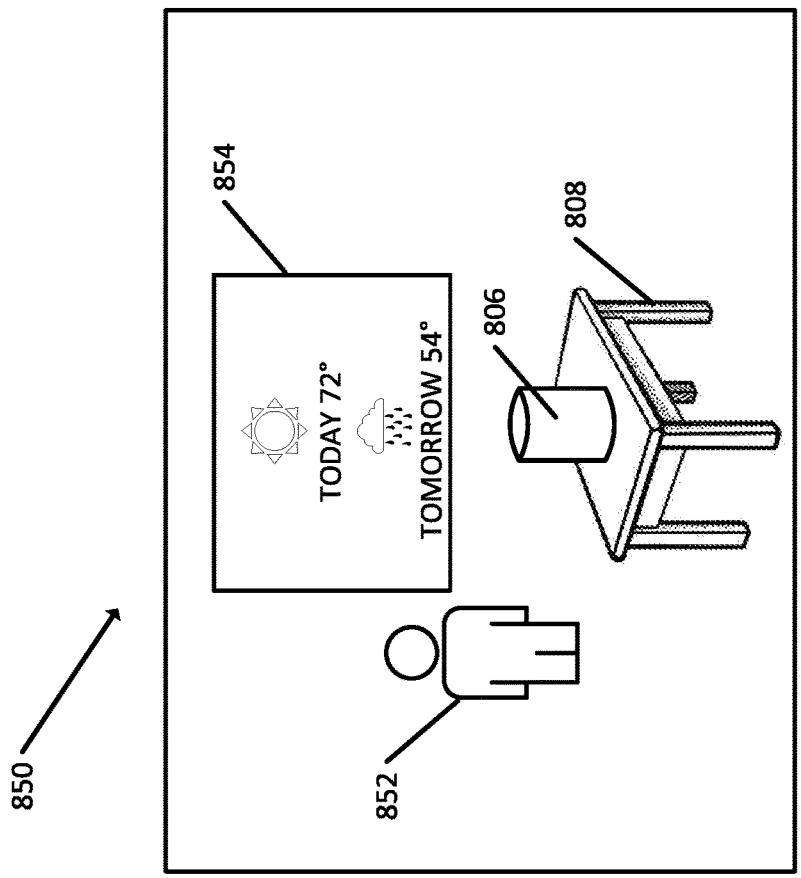
FIG. 8B is a diagram illustrating an example scene of a user in a second pose in a room looking at an image projected at the same location onto the wall by a projector.
Figure 8A:
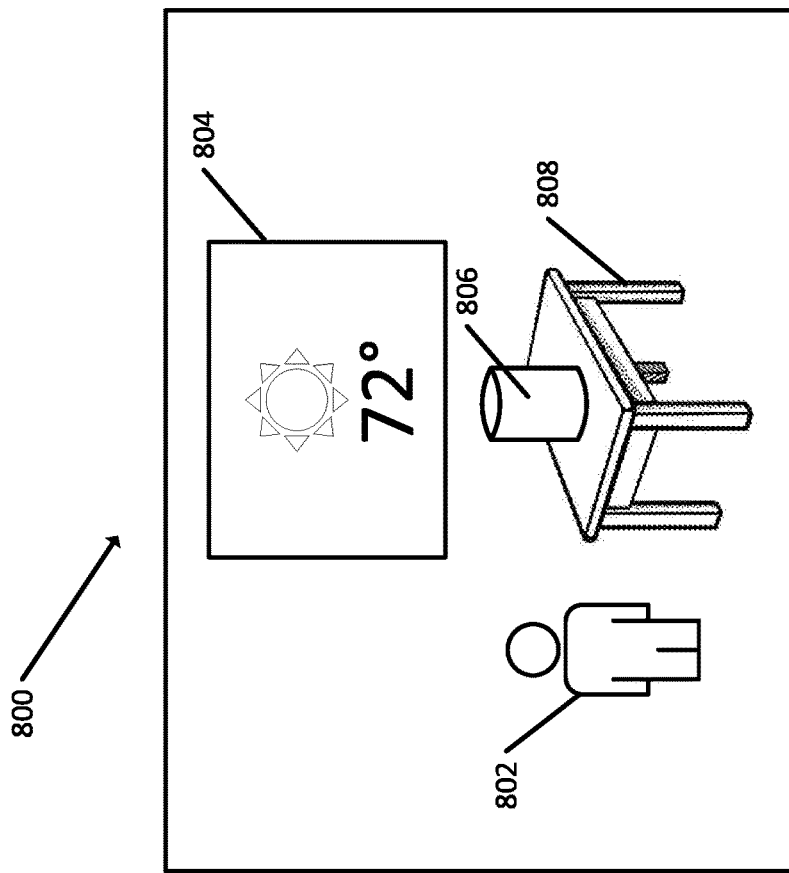
FIG. 8A is a diagram illustrating an example scene of a user in a first pose in a room looking at an image projected onto a wall by a projector using an automated assistant.

In many implementations, generating the base image can be based on the distance of the user from the projected image (i.e., the distance from the user to the surface the image is projected on). An example of a user viewing different base images projected onto a wall, where the projected base image is determined based on the user's distance from the projected image is illustrated in FIGS. 8A and 8B. Image 800 contains a first scene of a room at a first time and is illustrated in FIG. 8A. Image 800 contains user 802, projected image 804, client device 806 (that includes and integrated projector and/or is in communication with a locally accessible separate projector), and table 808. The contents of the room in image 800 are merely illustrative and, for example, the client device and/or projector can be separate devices, the client device and/or projector can be on a surface other than a table such as a desk, a dresser, and/or mounted onto surfaces such as a wall and/or ceiling, more than one client device can be present within the room, more than one projector can be within the room, and/or more than one user can be in the room. Client device 806 can determine the pose of user 802, and can determine a distance from user 802 to projected image 804. The client device identifies a base image depending on the distance from user 802 to projected image 804. Projected image 804 can be projected as the identified base image and/or as a transformed image.

The same room is illustrated in FIG. 8B. Image 850 is a second of the scene of the room captured at a second time which contains the same client device 806 (that includes and integrated projector and/or is in communication with a locally accessible separate projector), and table 808. As an illustrative example, the user has moved to a second pose 852 much closer to projected image 854. Similarly to FIG. 8A, the client device can determine the second pose of the user 852 before determining the distance from the second pose user 852 to projected image 854. The client device can then identify a second base image corresponding to the distance from second pose of the user 852 to projected image 854. Projected image 854 can be projected as the second identified base image and/or as a second transformed image.

Generally, the closer a user is to a projected image, the more detailed UI elements the identified base image will contain. For example, the first pose of user 802 is further away from the projected image compared to the second pose user 852. As such, projected image 804 contains less detailed weather information which includes weather information for today (for example, a graphical image of the sun and 72 degrees). In contrast, the second pose of user 852 is much closer to the projected image so projected image 854 contains more detailed information which includes weather information for both today and tomorrow (for example a graphical image of the sun a temperature of 72 degrees indicated as today's weather and a graphical image of a cloud with rain and a temperature of 54 degrees indicated as tomorrow's weather).

Figure 9:
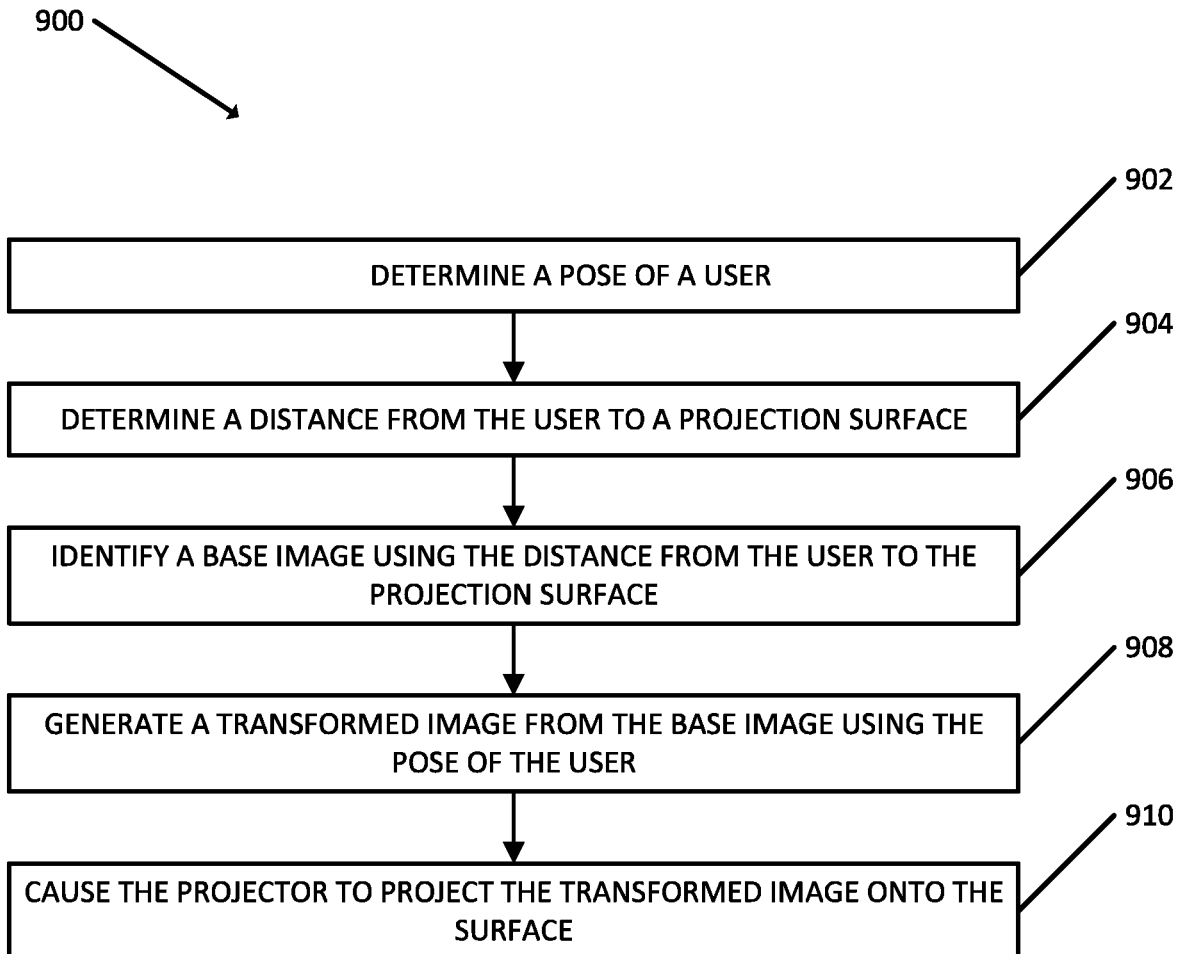
FIG. 9 is a flowchart illustrating an example process according to implementations disclosed herein.

A process for generating a base image based on the distance of a user from a projected image in accordance with various implementations is illustrated in FIG. 9. The process 900 can be performed by one or more client devices, and or/any other apparatus capable of interacting with an automated assistant. The process includes determining (902) the pose of a user by the client device. Determining the poser of a user (including user location) can be determined in a manner similar to determining a pose of a first user as described in step (304) of FIG. 3.

A distance from the user to a projection surface can be determined (904) by the client device. The projection surface is the location where a projected image is displayed. In several implementations, a client device can determine the distance from the user to the projection surface only using user pose. In many implementations, additional information such as the distance from the client device to the projection surface may be necessary to determine the distance from the user to the projection surface.

A base image can be identified (906) using the distance from the user to the projection surface. Base images with more detailed UI elements are generally selected for users closer to the projection surface while base images with less detailed UI elements are generally selected for users further away from the projection surface. In several implementations, a base image with touch sensitive UI elements can be identified for a user close enough to make physical contact with the projection surface. For example, a client device can select a base image with a full day of calendar information for a user who can touch the projection surface, and additionally in many implementations the user can touch the projected image to scroll through the projected calendar image.

A transformed image can be generated (908) from the base image using the pose of the user by the client device. In many implementations, generating a transformed image can be performed in a manner similar to steps (304)-(308) of FIG. 3. In some implementations, process 900 can omit generation of a transformed image and the generated base image can instead be projected.

The client device can cause (910) the projector to project the transformed image onto the surface. Projecting the transformed image can be performed in a manner similar to step (310) of FIG. 3.

Figure 10:
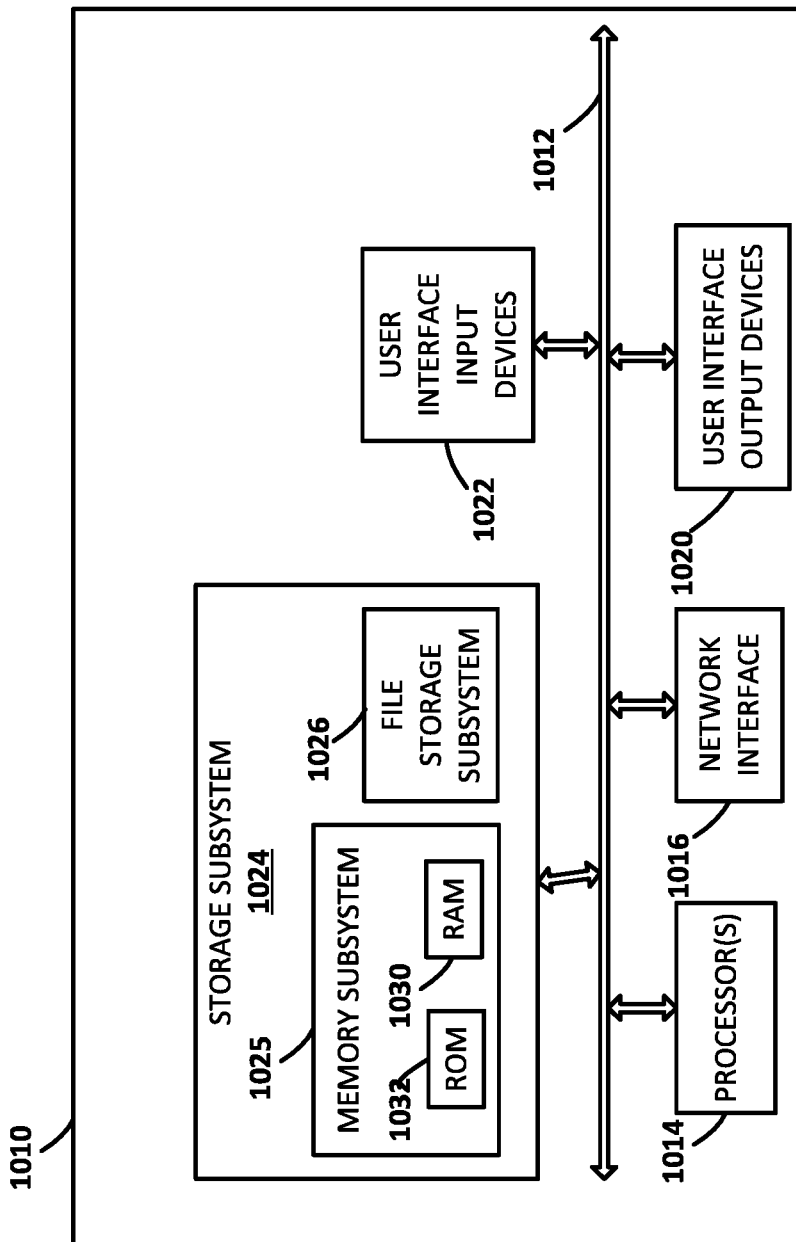
FIG. 10 is a block diagram illustrating an example architecture of a computing device.

FIG. 10 is a block diagram of an example computing device 1010 that may optionally be utilized to perform one or more aspects of techniques described herein. In some implementations, one or more of a client computing device, user-controlled resources module, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the process of FIG. 3, as well as to implement various components depicted in FIGS. 1 and 2.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. For example, in some implementations, users may opt out of having automated assistant 112 attempt to estimate their age range and/or vocabulary level.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors, comprising:
    identifying, by an automated assistant client of a computing device in an environment, a base image for projecting onto a surface via a projector accessible to the automated assistant client;
    determining, using sensor data from at least one sensor, a first pose of a user in the environment, wherein the sensor data is accessible to the automated assistant client, wherein identifying the base image comprises selecting the base image, from a plurality of base images, based on the first pose of the user;
    determining, using the first pose of the user, first image transformation parameters for warping images;
    generating a first transformed image that is a linear transformation of the base image, wherein generating the first transformed image comprises using the first image transformation parameters to warp the base image, wherein the first transformed image, when projected onto the surface and viewed from the first pose of the user, mitigates perceived differences relative to the base image;
causing the projector to project the first transformed image onto the surface;
determining, using additional sensor data from the at least one sensor, a second pose of the user in the environment, wherein the second pose of the user indicates the user has moved;
determining, using the second pose of the user, second image transformation parameters for warping images;
generating a second transformed image that is a linear transformation of the base image or of an additional base image, wherein generating the second transformed image comprises using the second transformation parameters to warp the base image or the additional base image, wherein the second transformed image, when projected onto the surface and viewed from the second pose of the user, mitigates perceived differences relative to the base image or the additional base image; and
causing the projector to project the second transformed image onto the surface.

2. The method of claim 1, wherein the base image is received, via a network interface of the computing device, from a remote automated assistant component that interfaces with the automated assistant client.

3. The method of claim 1, wherein the base image is generated by the automated assistant client based on data received, via a network interface of the computing device, from a remote automated assistant component that interfaces with the automated assistant client.

4. The method of claim 1, further comprising determining a distance of the surface to the projector using second sensor data from a second sensor, wherein the second sensor data is accessible to the automated assistant client.

5. The method of claim 4, wherein determining the first image transformation parameters for warping images comprises determining the first image transformation parameters using the first pose of the user and using the distance of the surface to the projector.

6. The method of claim 4, wherein generating the second transformed image further comprises using the second pose of the user and the distance from the surface to the projector to warp the base image.

7. The method of claim 1, wherein generating the first transformed image that is the linear transformation of the base image comprises performing at least one linear transformation on the base image, wherein the at least one linear transformation is selected from a group consisting of rotation of the base image, scaling of the base image, and skew adjustment of the base image.

8. The method of claim 1, wherein the base image has first dimensions and the first transformed image has the same first dimensions.

9. The method of claim 8, wherein the base image comprises base image pixels each having corresponding values assigned thereto, and wherein the transformed image comprises transformed image pixels, wherein the transformed image pixels have the same corresponding values, but wherein the assignment of the same corresponding values to the transformed image pixels differs from the assignment of the corresponding values to the base image pixels in the base image.

10. The method of claim 1, further comprising:
determining, based on the first pose of the user, a desired size for the projection of the first transformed image;
wherein causing the projector to project the first transformed image onto the surface comprises causing the projector to project the first transformed image to achieve the desired size for the projection.

11. The method of claim 1, wherein selecting the base image based on the first pose of the user comprises:
determining a distance of the user based on the first pose of the user, the distance being relative to the projector or the surface; and
selecting the base image based on the distance corresponding to a distance measure assigned to the base image.

12. The method of claim 1, further comprising:
generating, by the automated assistant client, the base image based on the pose of the user, wherein generating the base image based on the pose of the user comprises:
determining the pose of the user is within a threshold distance of the surface;
based on determining the pose of the user is within a threshold distance of the surface, generating the base image to include one or more interactive interface elements.

13. A method implemented by one or more processors, comprising:
identifying, by an automated assistant client of a computing device, a base image for projecting onto a surface via a projector accessible to the automated assistant client;
identifying a plurality of users that are in an environment with the computing device;
determining, using sensor data from at least one sensor accessible to the computing device, that a subset of the users are active users for the automated assistant client;
determining at least one pose for the subset of the users that are determined to be active users, wherein determining the at least one pose is based on the sensor data or additional sensor data from at least one additional sensor accessible to the computing device;
based on determining that the subset of the users are active users, using the at least one pose for the subset of the users in generating a transformed image of the base image; and
causing the projector to project the transformed image onto the surface.

14. The method of claim 13, further comprising:
determining, using additional sensor data from the at least one sensor, that a second subset of the users are active users for the automated assistant client, wherein the additional sensor data is generated at a time subsequent to the sensor data, and wherein the second subset of the users varies from the first subset of the users;
determining at least one second pose for the second subset of the users that are determined to be active users, wherein determining the at least one second pose is based on the additional sensor data;
based on determining that the second subset of the users are active users, using the at least one second pose for the second subset of the users in generating a second transformed image of the base image, or of an additional image, using the at least one second pose; and
causing the projector to project the second transformed image onto the surface.

15. The method of claim 13, further comprising:
determining a gaze for the subset of the users that are determined to be active users, wherein determining the gaze is based on the sensor data or additional sensor data;
generating the transformed image using the determined gaze of the one or more active users.

16. The method of claim 13, further comprising:
determining, based on the pose of the subset of the users, a desired size for the projection of the transformed image;
wherein causing the projector to project the transformed image onto the surface comprises causing the projector to project the transformed image to achieve the desired size for the projection.

17. A method implemented by one or more processors, comprising:
identifying, by an automated assistant client of a computing device, a base image for projecting via a projector accessible to the automated assistant client;
identifying a plurality of users that are in an environment with the computing device;
determining, using sensor data from at least one sensor accessible to the computing device, that a subset of the users are active users for the automated assistant client;
determining at least one pose for the subset of the users that are determined to be active users, wherein determining the at least one pose is based on the sensor data or additional sensor data from at least one additional sensor accessible to the computing device;
based on determining that the subset of the users are active users, using the at least one pose for the subset of the users in determining one or more projection parameters for a projection that includes the base image, or a transformed image that is a transform of the base image; and
causing the projector to project the projection onto a surface.

18. The method of claim 17, wherein the one or more projection parameters include one or multiple of: a size of the base image or the transformed image in the projection, a size of the projection, a location of the base image or the transformed image in the projection, and a location of the projection.

19. The method of claim 17,
wherein identifying the base image for projecting via the projector accessible to the automated assistant client is based on audio data of an utterance spoken by a given user; and
wherein determining that the subset of users are active users comprises:
including the given user in the subset based on determining that the utterance is spoken by the given user.

* * * * *